(12) United States Patent
Kikuchi

(10) Patent No.: US 7,872,670 B2
(45) Date of Patent: Jan. 18, 2011

(54) CAMERA PERFORMING PHOTOGRAPHING IN ACCORDANCE WITH PHOTOGRAPHING MODE DEPENDING ON OBJECT SCENE

(75) Inventor: Kenichi Kikuchi, Hyogo (JP)

(73) Assignee: Sanyo Electric Co., Ltd., Osaka (JP)

( * ) Notice: Subject to any disclaimer, the term of this patent is extended or adjusted under 35 U.S.C. 154(b) by 1803 days.

(21) Appl. No.: 10/420,064

(22) Filed: Apr. 21, 2003

(65) Prior Publication Data

US 2003/0197792 A1    Oct. 23, 2003

(30) Foreign Application Priority Data

| Apr. 22, 2002 | (JP) | ............................ 2002-119710 |
| Apr. 22, 2002 | (JP) | ............................ 2002-119711 |
| Apr. 22, 2002 | (JP) | ............................ 2002-119712 |
| Apr. 22, 2002 | (JP) | ............................ 2002-119713 |

(51) Int. Cl.
*H04N 5/228* (2006.01)
*H04N 5/225* (2006.01)

(52) U.S. Cl. .................. 348/208.16; 348/157; 348/352

(58) Field of Classification Search ................ 348/157, 348/208.12, 208.16, 240.3, 347, 348, 362–364, 348/352, 220.1, 221.1
See application file for complete search history.

(56) References Cited

U.S. PATENT DOCUMENTS

| 5,128,769 | A | * | 7/1992 | Arai et al. | .................. 348/363 |
| 5,561,474 | A | | 10/1996 | Kojima et al. | .............. 348/653 |
| 6,014,167 | A | * | 1/2000 | Suito et al. | .................. 348/169 |
| 6,151,403 | A | | 11/2000 | Luo | ............................ 382/117 |
| 6,323,898 | B1 | * | 11/2001 | Koyanagi et al. | ........... 348/169 |
| 6,614,996 | B2 | * | 9/2003 | Okisu et al. | ................... 396/63 |
| 6,683,652 | B1 | * | 1/2004 | Ohkawara et al. | .......... 348/347 |
| 6,792,203 | B1 | | 9/2004 | Ide et al. | ........................ 396/65 |
| 6,906,744 | B1 | | 6/2005 | Hoshuyama et al. | ...... 348/223.1 |
| 7,030,911 | B1 | * | 4/2006 | Kubo | ...................... 348/221.1 |
| 7,042,509 | B2 | * | 5/2006 | Onuki | ......................... 348/362 |
| 7,209,183 | B2 | | 4/2007 | Kim | ........................... 348/678 |
| 7,539,407 | B2 | | 5/2009 | Maeda | ........................ 396/178 |
| 2002/0136450 | A1 | | 9/2002 | Chen et al. | .................. 382/165 |
| 2002/0145667 | A1 | * | 10/2002 | Horiuchi | ................ 348/207.99 |
| 2007/0146538 | A1 | * | 6/2007 | Kakinuma et al. | .......... 348/362 |

FOREIGN PATENT DOCUMENTS

| JP | 03-233329 | 10/1991 | |
| JP | 03-176719 | 1/1993 | .................... 5/232 |
| JP | 03-263870 | 4/1993 | |
| JP | 05-103256 | 4/1993 | |
| JP | 08-038215 | 9/1997 | .................... 5/91 |

(Continued)

*Primary Examiner*—David L Ometz
*Assistant Examiner*—Carramah J Quiett
(74) *Attorney, Agent, or Firm*—Gerald T. Bodner

(57) ABSTRACT

A camera includes a CPU. The CPU individually detects a ratio of an object which exceeds a threshold value in a moving amount to a center area of an object scene and a ratio of an object which exceeds the threshold value in the moving amount to a peripheral area of the object scene. If differences between the respective detected ratios are large, the CPU sets a photographing mode to a sports mode. When a shutter button is operated, the object scene is photographed in accordance with a set photographing mode.

6 Claims, 25 Drawing Sheets

FOREIGN PATENT DOCUMENTS

| | | | |
|---|---|---|---|
| JP | 09-281543 | 10/1997 | |
| JP | 08-325715 | 6/1998 | ............ 7/8 |
| JP | 10-253449 | 9/1998 | |
| JP | 09-198509 | 2/1999 | ............ 5/232 |
| JP | 2001-075141 | 3/2001 | |
| JP | 2001-100299 | 4/2001 | |
| JP | 2000-110975 | 10/2001 | |

* cited by examiner

| 0,0 | 0,1 | 0,2 | 0,3 | 0,4 | 0,5 | 0,6 | 0,7 | 0,8 | 0,9 | 0,10 | 0,11 | 0,12 | 0,13 | 0,14 | 0,15 |
|---|---|---|---|---|---|---|---|---|---|---|---|---|---|---|---|
| 1,0 | 1,1 | 1,2 | 1,3 | 1,4 | 1,5 | 1,6 | 1,7 | 1,8 | 1,9 | 1,10 | 1,11 | 1,12 | 1,13 | 1,14 | 1,15 |
| 2,0 | 2,1 | 2,2 | 2,3 | 2,4 | 2,5 | 2,6 | 2,7 | 2,8 | 2,9 | 2,10 | 2,11 | 2,12 | 2,13 | 2,14 | 2,15 |
| 3,0 | 3,1 | 3,2 | 3,3 | 3,4 | 3,5 | 3,6 | 3,7 | 3,8 | 3,9 | 3,10 | 3,11 | 3,12 | 3,13 | 3,14 | 3,15 |
| 4,0 | 4,1 | 4,2 | 4,3 | 4,4 | 4,5 | 4,6 | 4,7 | 4,8 | 4,9 | 4,10 | 4,11 | 4,12 | 4,13 | 4,14 | 4,15 |
| 5,0 | 5,1 | 5,2 | 5,3 | 5,4 | 5,5 | 5,6 | 5,7 | 5,8 | 5,9 | 5,10 | 5,11 | 5,12 | 5,13 | 5,14 | 5,15 |
| 6,0 | 6,1 | 6,2 | 6,3 | 6,4 | 6,5 | 6,6 | 6,7 | 6,8 | 6,9 | 6,10 | 6,11 | 6,12 | 6,13 | 6,14 | 6,15 |
| 7,0 | 7,1 | 7,2 | 7,3 | 7,4 | 7,5 | 7,6 | 7,7 | 7,8 | 7,9 | 7,10 | 7,11 | 7,12 | 7,13 | 7,14 | 7,15 |
| 8,0 | 8,1 | 8,2 | 8,3 | 8,4 | 8,5 | 8,6 | 8,7 | 8,8 | 8,9 | 8,10 | 8,11 | 8,12 | 8,13 | 8,14 | 8,15 |
| 9,0 | 9,1 | 9,2 | 9,3 | 9,4 | 9,5 | 9,6 | 9,7 | 9,8 | 9,9 | 9,10 | 9,11 | 9,12 | 9,13 | 9,14 | 9,15 |
| 10,0 | 10,1 | 10,2 | 10,3 | 10,4 | 10,5 | 10,6 | 10,7 | 10,8 | 10,9 | 10,10 | 10,11 | 10,12 | 10,13 | 10,14 | 10,15 |
| 11,0 | 11,1 | 11,2 | 11,3 | 11,4 | 11,5 | 11,6 | 11,7 | 11,8 | 11,9 | 11,10 | 11,11 | 11,12 | 11,13 | 11,14 | 11,15 |
| 12,0 | 12,1 | 12,2 | 12,3 | 12,4 | 12,5 | 12,6 | 12,7 | 12,8 | 12,9 | 12,10 | 12,11 | 12,12 | 12,13 | 12,14 | 12,15 |
| 13,0 | 13,1 | 13,2 | 13,3 | 13,4 | 13,5 | 13,6 | 13,7 | 13,8 | 13,9 | 13,10 | 13,11 | 13,12 | 13,13 | 13,14 | 13,15 |
| 14,0 | 14,1 | 14,2 | 14,3 | 14,4 | 14,5 | 14,6 | 14,7 | 14,8 | 14,9 | 14,10 | 14,11 | 14,12 | 14,13 | 14,14 | 14,15 |
| 15,0 | 15,1 | 15,2 | 15,3 | 15,4 | 15,5 | 15,6 | 15,7 | 15,8 | 15,9 | 15,10 | 15,11 | 15,12 | 15,13 | 15,14 | 15,15 |

CTR1   PER1

FIG. 25

| 0,0 | 0,1 | 0,2 | 0,3 | 0,4 | 0,5 | 0,6 | 0,7 | 0,8 | 0,9 | 0,10 | 0,11 | 0,12 | 0,13 | 0,14 | 0,15 |
|---|---|---|---|---|---|---|---|---|---|---|---|---|---|---|---|
| 1,0 | 1,1 | 1,2 | 1,3 | 1,4 | 1,5 | 1,6 | 1,7 | 1,8 | 1,9 | 1,10 | 1,11 | 1,12 | 1,13 | 1,14 | 1,15 |
| 2,0 | 2,1 | 2,2 | 2,3 | 2,4 | 2,5 | 2,6 | 2,7 | 2,8 | 2,9 | 2,10 | 2,11 | 2,12 | 2,13 | 2,14 | 2,15 |
| 3,0 | 3,1 | 3,2 | 3,3 | 3,4 | 3,5 | 3,6 | 3,7 | 3,8 | 3,9 | 3,10 | 3,11 | 3,12 | 3,13 | 3,14 | 3,15 |
| 4,0 | 4,1 | 4,2 | 4,3 | 4,4 | 4,5 | 4,6 | 4,7 | 4,8 | 4,9 | 4,10 | 4,11 | 4,12 | 4,13 | 4,14 | 4,15 |
| 5,0 | 5,1 | 5,2 | 5,3 | 5,4 | 5,5 | 5,6 | 5,7 | 5,8 | 5,9 | 5,10 | 5,11 | 5,12 | 5,13 | 5,14 | 5,15 |
| 6,0 | 6,1 | 6,2 | 6,3 | 6,4 | 6,5 | 6,6 | 6,7 | 6,8 | 6,9 | 6,10 | 6,11 | 6,12 | 6,13 | 6,14 | 6,15 |
| 7,0 | 7,1 | 7,2 | 7,3 | 7,4 | 7,5 | 7,6 | 7,7 | 7,8 | 7,9 | 7,10 | 7,11 | 7,12 | 7,13 | 7,14 | 7,15 |
| 8,0 | 8,1 | 8,2 | 8,3 | 8,4 | 8,5 | 8,6 | 8,7 | 8,8 | 8,9 | 8,10 | 8,11 | 8,12 | 8,13 | 8,14 | 8,15 |
| 9,0 | 9,1 | 9,2 | 9,3 | 9,4 | 9,5 | 9,6 | 9,7 | 9,8 | 9,9 | 9,10 | 9,11 | 9,12 | 9,13 | 9,14 | 9,15 |
| 10,0 | 10,1 | 10,2 | 10,3 | 10,4 | 10,5 | 10,6 | 10,7 | 10,8 | 10,9 | 10,10 | 10,11 | 10,12 | 10,13 | 10,14 | 10,15 |
| 11,0 | 11,1 | 11,2 | 11,3 | 11,4 | 11,5 | 11,6 | 11,7 | 11,8 | 11,9 | 11,10 | 11,11 | 11,12 | 11,13 | 11,14 | 11,15 |
| 12,0 | 12,1 | 12,2 | 12,3 | 12,4 | 12,5 | 12,6 | 12,7 | 12,8 | 12,9 | 12,10 | 12,11 | 12,12 | 12,13 | 12,14 | 12,15 |
| 13,0 | 13,1 | 13,2 | 13,3 | 13,4 | 13,5 | 13,6 | 13,7 | 13,8 | 13,9 | 13,10 | 13,11 | 13,12 | 13,13 | 13,14 | 13,15 |
| 14,0 | 14,1 | 14,2 | 14,3 | 14,4 | 14,5 | 14,6 | 14,7 | 14,8 | 14,9 | 14,10 | 14,11 | 14,12 | 14,13 | 14,14 | 14,15 |
| 15,0 | 15,1 | 15,2 | 15,3 | 15,4 | 15,5 | 15,6 | 15,7 | 15,8 | 15,9 | 15,10 | 15,11 | 15,12 | 15,13 | 15,14 | 15,15 |

CRS1

FIG. 26

PER2a

| 0,0 | 0,1 | 0,2 | 0,3 | 0,4 | 0,5 | 0,6 | 0,7 | 0,8 | 0,9 | 0,10 | 0,11 | 0,12 | 0,13 | 0,14 | 0,15 |
|---|---|---|---|---|---|---|---|---|---|---|---|---|---|---|---|
| 1,0 | 1,1 | 1,2 | 1,3 | 1,4 | 1,5 | 1,6 | 1,7 | 1,8 | 1,9 | 1,10 | 1,11 | 1,12 | 1,13 | 1,14 | 1,15 |
| 2,0 | 2,1 | 2,2 | 2,3 | 2,4 | 2,5 | 2,6 | 2,7 | 2,8 | 2,9 | 2,10 | 2,11 | 2,12 | 2,13 | 2,14 | 2,15 |
| 3,0 | 3,1 | 3,2 | 3,3 | 3,4 | 3,5 | 3,6 | 3,7 | 3,8 | 3,9 | 3,10 | 3,11 | 3,12 | 3,13 | 3,14 | 3,15 |
| 4,0 | 4,1 | 4,2 | 4,3 | 4,4 | 4,5 | 4,6 | 4,7 | 4,8 | 4,9 | 4,10 | 4,11 | 4,12 | 4,13 | 4,14 | 4,15 |
| 5,0 | 5,1 | 5,2 | 5,3 | 5,4 | 5,5 | 5,6 | 5,7 | 5,8 | 5,9 | 5,10 | 5,11 | 5,12 | 5,13 | 5,14 | 5,15 |
| 6,0 | 6,1 | 6,2 | 6,3 | 6,4 | 6,5 | 6,6 | 6,7 | 6,8 | 6,9 | 6,10 | 6,11 | 6,12 | 6,13 | 6,14 | 6,15 |
| 7,0 | 7,1 | 7,2 | 7,3 | 7,4 | 7,5 | 7,6 | 7,7 | 7,8 | 7,9 | 7,10 | 7,11 | 7,12 | 7,13 | 7,14 | 7,15 |
| 8,0 | 8,1 | 8,2 | 8,3 | 8,4 | 8,5 | 8,6 | 8,7 | 8,8 | 8,9 | 8,10 | 8,11 | 8,12 | 8,13 | 8,14 | 8,15 |
| 9,0 | 9,1 | 9,2 | 9,3 | 9,4 | 9,5 | 9,6 | 9,7 | 9,8 | 9,9 | 9,10 | 9,11 | 9,12 | 9,13 | 9,14 | 9,15 |
| 10,0 | 10,1 | 10,2 | 10,3 | 10,4 | 10,5 | 10,6 | 10,7 | 10,8 | 10,9 | 10,10 | 10,11 | 10,12 | 10,13 | 10,14 | 10,15 |
| 11,0 | 11,1 | 11,2 | 11,3 | 11,4 | 11,5 | 11,6 | 11,7 | 11,8 | 11,9 | 11,10 | 11,11 | 11,12 | 11,13 | 11,14 | 11,15 |
| 12,0 | 12,1 | 12,2 | 12,3 | 12,4 | 12,5 | 12,6 | 12,7 | 12,8 | 12,9 | 12,10 | 12,11 | 12,12 | 12,13 | 12,14 | 12,15 |
| 13,0 | 13,1 | 13,2 | 13,3 | 13,4 | 13,5 | 13,6 | 13,7 | 13,8 | 13,9 | 13,10 | 13,11 | 13,12 | 13,13 | 13,14 | 13,15 |
| 14,0 | 14,1 | 14,2 | 14,3 | 14,4 | 14,5 | 14,6 | 14,7 | 14,8 | 14,9 | 14,10 | 14,11 | 14,12 | 14,13 | 14,14 | 14,15 |
| 15,0 | 15,1 | 15,2 | 15,3 | 15,4 | 15,5 | 15,6 | 15,7 | 15,8 | 15,9 | 15,10 | 15,11 | 15,12 | 15,13 | 15,14 | 15,15 |

PER2c, PER2b, PER2d

US 7,872,670 B2

CAMERA PERFORMING PHOTOGRAPHING IN ACCORDANCE WITH PHOTOGRAPHING MODE DEPENDING ON OBJECT SCENE

BACKGROUND OF THE INVENTION

1. Field of the Invention

The present invention relates to a camera. More specifically, the present invention relates to a camera which performs photographing (image capturing) in accordance with a photographing mode (image capturing mode) depending upon object scenes when a photographing operation (image capturing operation) is performed.

2. Description of the Prior Art

As a conventional camera, there is a camera provided with a sports mode suitable for photographing an object with an intensive movement. In the photographing mode, a program diagram is corrected such that an aperture is opened and an exposure time is shortened, and whereby, it is possible to sharply photograph the object with intensive movement. However, in the prior art, there is a need to manually set the photographing mode, and there is a problem in operability.

Furthermore, as another conventional camera, there is a camera provided with a night scene mode suitable for photographing a night scene. In the photographing mode, the program diagram is corrected so that illuminations are highlighted, and whereby, it is possible to sharply photograph the night scene. However, in the prior art, there is a need to manually set the photographing mode, and there is a problem in operability.

Furthermore, as the other conventional camera, there is a camera provided with an evening scene mode suitable for photographing a evening scene. In the photographing mode, the program diagram is corrected such that an aperture is closed and an exposure time is extended, and a white balance adjustment gain is set such that red is emphasized. Thus, it is possible to sharply photograph the evening scene. However, there is a need to manually set the photographing mode, and there is a problem of operability.

In addition, as further conventional camera, there is a camera provided with a portrait mode suitable for photographing a face of a person. In the photographing mode, a program diagram is corrected such that an aperture is opened and an exposure time is shortened, and the white balance adjustment gain is corrected such that a change of a skin color of the person is prevented. Thus, it is possible to photograph the face with a healthy expression in a state of backgrounds blurred. However, in the prior art, there is a need to manually set the photographing mode, and there is a problem in operability.

SUMMARY OF THE INVENTION

Therefore, it is a main object of the present invention to provide a camera capable of improving operability.

According to the present invention, a camera performing photographing in accordance with a photographing mode corresponding to an object scene when a photographing operation is performed comprises: a first ratio detector for detecting a first ratio of an object exceeding a first threshold value in a moving amount to a center area of the object scene; a second ratio detector for detecting a second ratio of an object exceeding a second threshold value in the moving amount to a peripheral area of the object scene; and a determiner for determining the photographing mode on the basis of the first ratio and the second ratio.

The first ratio detector detects the first ratio of the object exceeding the first threshold value in the moving amount to the center area of the object scene, and the second ratio detector detects the second ratio of the object exceeding the second threshold value in the moving amount to the peripheral area of the object scene. The photographing mode is determined by the determiner on the basis of the first ratio and the second ratio. When the photographing operation is performed, the object scene is photographed in a determined photographing mode.

How the object moves in the peripheral area of the object scene and how the object moves in the center area of the object scene are clues for determining the object scene. This is the reason why the photographing mode is determined on the basis of the first ratio detected in the peripheral area and the second ratio detected in the center area in this invention. Thus, it is possible to improve operability of the camera.

Preferably, when a difference between the first ratio and the second ratio is large, the photographing mode is set to the sports mode.

If a first image signal of the object scene photographed just before a photographing operation is performed and a second image signal of the object scene photographed immediately after the photographing operation is performed are detected as a moving amount, responsivity is improved.

If a message corresponding to the photographing mode determined by the determiner is output, an operator can easily determine whether or not the photographing mode is a desired mode.

According to the present invention, a camera performing photographing in accordance with a photographing mode corresponding to an object scene comprises a first detector for detecting an average luminance of the object scene; a second detector for detecting a ratio of a high luminance area to the object scene; and a determiner for determining the photographing mode on the basis of the average luminance and the ratio.

The average luminance of the object scene is detected by the first detector, and the ratio of the high luminance area to the object scene is detected by the second detector. The photographing mode is determined by the determiner on the basis of the detected average luminance and ratio.

The average luminance of the object scene and the ratio of the high luminance area to the object scene become clues for identifying the object scene. This is a reason why the photographing mode is determined on the basis of the detected average luminance and the ratio. Thus, it is possible to improve operability of the camera.

Preferably, when the average luminance is small and the ratio is large, the photographing mode is set to the night scene mode.

It is noted that if a message corresponding to the photographing mode determined by the determiner is output, the operator can easily determine whether or not the photographing mode is a desired mode.

According to the present invention, a camera performing photographing in a photographing mode corresponding to an object scene comprises a ratio detector for detecting a ratio of a high luminance evening scene color area to a defined area formed in a cross shape in the object scene; a luminance difference detector for detecting a luminance difference between periphery areas opposed with each other in the object scene; and a determiner for determining the photographing mode on the basis of the ratio and the luminance difference.

The ratio of the high luminance evening scene color area to the defined area formed in a cross shape in the object scene is detected by the ratio detector. Furthermore, the luminance difference between the periphery areas opposed with each other in the object scene is detected by the luminance difference detector. The determiner determines the photographing mode on the basis of the detected ratio and the luminance difference. The object scene is photographed by the determined photographing mode.

The ratio of the high luminance evening scene color area to the defined area formed in a cross shape in the object scene is a clue for identifying the object scene. This is a reason why, in the present invention, the photographing mode is determined on the basis of the detected ratio and luminance difference, and whereby, it is possible to improve operability of the camera.

Preferably, when the luminance difference and the ratio are large, the photographing mode is set to the evening scene mode.

It is noted that if a message corresponding to the photographing mode determined by the determiner is output, the operator can easily determine whether or not the photographing mode is a desired mode.

According to the present invention, a camera for performing photographing in accordance with a photographing mode corresponding to an object scene comprises a first measure for measuring a distance to a main object existing in the object scene; a specifier for specifying from the object scene a face area to be occupied by a face of a person on the basis of a distance measured by the first measure; a detector for detecting a skin color area of the object scene; and a determiner for determining the photographing mode on the basis of a relationship between the face area and the skin color area.

When the distance to the main object existing in the object scene is measured by the first measure, the specifier specifies the face area to be occupied by the face of the person from the object scene on the basis of the measured distance. On the other hand, the skin area of the object scene is detected by the detector. The photographing mode is determined by the determiner on the basis of a relationship between the face area and the skin color area, and whereby, it is possible to improve operability of the camera.

Since a size of the face of the person is assumed in advance, when the distance to the main object is measured, it is possible to specify the face area from the object scene. The photographing mode is determined on the basis of a relation between the face area and skin color area of the object scene thus specified. Thus, it is possible to improve operability of the camera.

In a case a zoom lens is provided, the distance to the main object may be measured on the basis of a position of the zoom lens.

Preferably, an optical image of the object scene through the focus lens is incident to the light-receiving surface of the image sensor, and a distance between the focus lens and the light-receiving surface is determined by a second measure. The specifier specifies the face area of an object scene image projected on the light-receiving surface on the basis of the distance to the main object and the distance between the focus lens and the light-receiving surface.

Preferably, the determiner determines a size of a first skin color area included in the face area and a size of a second color skin area excluded from the face area, and the photographing mode is set to the portrait mode on the basis of the sizes of the first skin color area and the second skin color area.

If a message corresponding to the photographing mode determined by the determiner is output, the operator can easily determine whether or not the photographing mode is a desired mode.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 25 is an illustrative view showing a part of the operation of FIG. 1 embodiment;

FIG. 26 is an illustrative view showing another part of the operation of FIG. 1 embodiment;

DETAILED DESCRIPTION OF THE PREFERRED EMBODIMENTS

Figure 1:
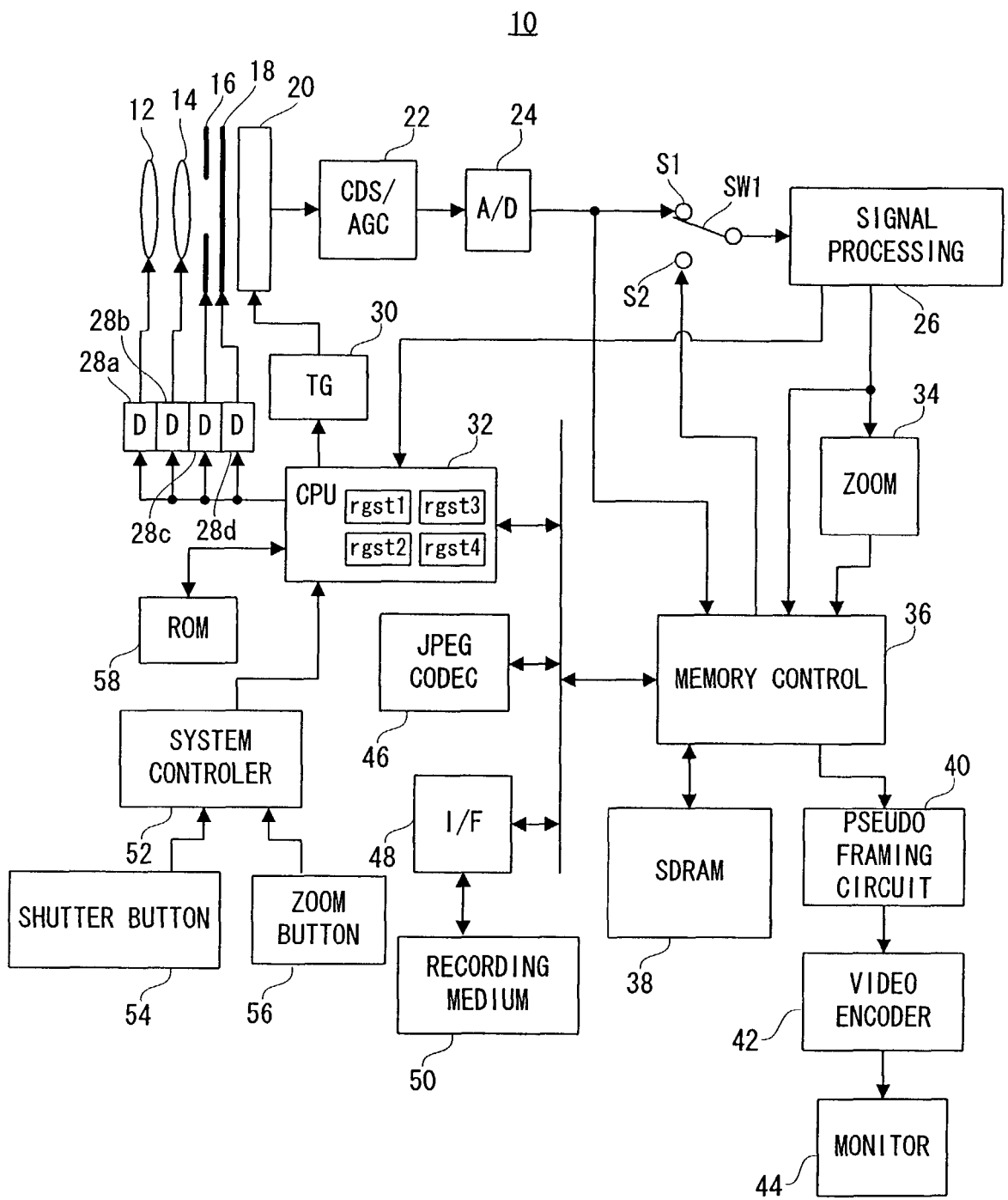
FIG. 1 is a block diagram showing a configuration of one embodiment of the present invention.

Referring to FIG. 1, a digital camera 10 of this embodiment includes a zoom lens 12, a focus lens 14, an aperture system 16 and a shutter system 18. An optical image of an object scene is incident to a light-receiving surface of an image sensor 20 through such the members. The number of effective pixels on the image sensor 20 is approximately 4 million, and the light-receiving surface has 2300 pixels and 1740 lines in horizontal and vertical directions, respectively. The light receiving surface is covered with a color filter (not shown) in which Cy (cyan) Ye (yellow) Mg (magenta) and G (green) is arranged in a mosaic fashion, and each pixel of a raw image signal generated by a photoelectric conversion has color information of Cy, Ye, Mg or G.

When a power is turned on, a CPU 32 instructs a TG (Timing Generator 30) to perform vertical thin-out reading to ⅙, and sets a horizontal zoom magnification and a vertical zoom magnification of a zoom circuit 34 into "¼" and "1", respectively so as to display a real-time motion image (through image) of an object on a monitor 44. The TG 30 performs the thin-out reading on the image sensor 20, and whereby, a raw image signal having 2300 pixels×290 lines in which a line formed by Cy and Ye and a line formed by Mg and G are alternately included is output from the image sensor 20 at a ratio of one frame to 1/30 seconds.

The raw image signal of each frame output from the image sensor 20 is subjected to a noise removal and a level adjustment by a CDS/AGC circuit 22. An A/D converter 24 converts the raw image signal output from the CDS/AGC circuit 22 to a digital signal. At a time the power is turned on, a switch SW1 is connected to a terminal S1, whereby the raw image signal output from the A/D converter 24 is input to a signal processing circuit 26 via the switch SW1.

Figures 2, 3:
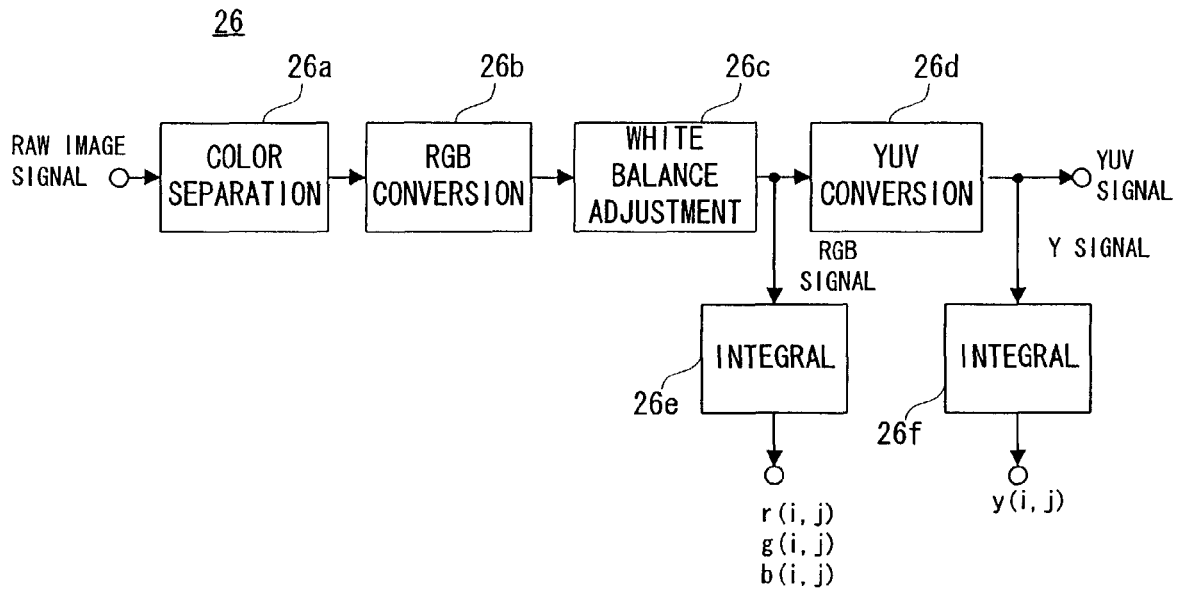
FIG. 2 is a block diagram showing one example of a configuration of a signal processing circuit applied to FIG. 1 embodiment.
FIG. 3 is an illustrative view showing one example of blocks formed on a screen.

The signal processing circuit 26 is configured as shown in FIG. 2. Each pixel forming the raw image signal has information of only one color out of Cy, Ye, Mg and G, and therefore, color information lacking in each of pixels is complemented by a color separation circuit 26a at first. An RGB conversion circuit 26b performs an RGB conversion on a complementary color image signal output from the color separation circuit 26a, and a white balance adjustment circuit 26c performs a white balance adjustment on a primary color image signal output form the RGB conversion circuit 26b. The primary color image signal having been subjected to the white balance adjustment is converted into a YUV signal by a YUV conversion circuit 26d. The generated YUV signal composed of Y:U:V has a ratio of 4:2:2.

The primary color image signal output from the white balance adjustment circuit 26c is input to an integration circuit 26e, and a Y signal forming the YUV signal output from the YUV conversion circuit 26d is also applied to an integration circuit 26f. Referring to FIG. 3, an object scene (screen) is divided into 16 in vertical and horizontal directions and has blocks of 256 on the screen. A vertical position number i(=0~15) and a horizontal position number j(=0~15) are assigned to each of blocks.

The integration circuit 26d integrates each of R signal, G signal and B signal forming the primary color signal at every block, and the integration circuit 26f integrates the Y signal at every block. Thus, integral values r(i,j) of 256 with respect to the R signal, integral values g(i,j) of 256 with respect to the G signal and integral values b(i,j) of 256 with respect to the B signal are output from the integration circuit 26e at every one frame of period, and integral values y(i,j) of 256 with respect to the Y signal are output from the integration circuit 26f at every one frame of period.

Returning to FIG. 1, the YUV signal output from the signal processing circuit 26 is applied to the zoom circuit 34. The YUV signal has a resolution of 2300 pixels×290 lines and the horizontal zoom magnification and the vertical zoom magnification of the zoom circuit 34 are set to "¼" and "1", respectively, and therefore, the YUV signal having 575 pixels×290 lines is output from the zoom circuit 34.

Figure 4:
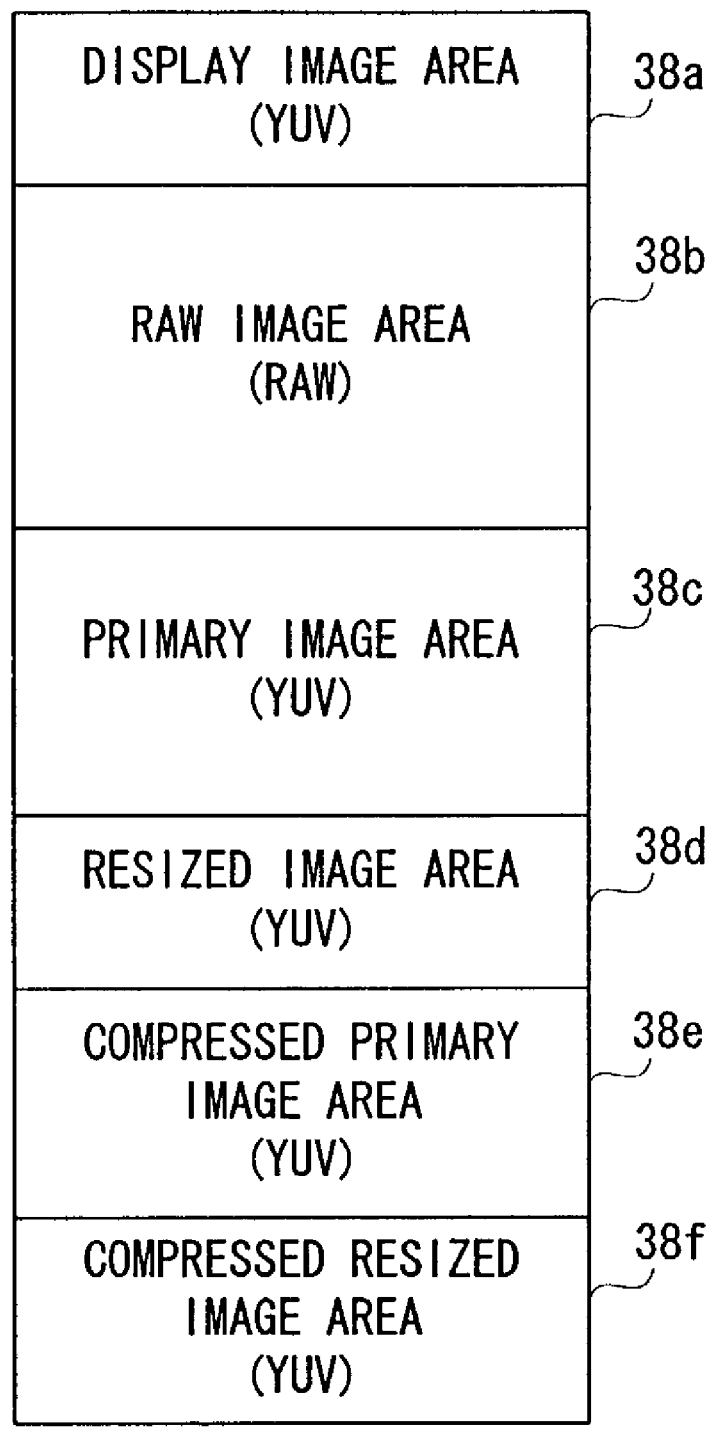
FIG. 4 is an illustrative view showing one example of a mapping state of an SDRAM applied to FIG. 1 embodiment.

The YUV signal output from the zoom circuit 34 is written to a display image area 38a (see FIG. 4) of an SDRAM 38 by a memory control circuit 36, and then, read from the display image area 38a by the memory control circuit 36. The resolution of the read YUV signal is converted into 575 pixels× 580 lines by a pseudo framing circuit 40, and the converted YUV signal is encoded into a composite video signal of 640 pixels×480 lines by a video encoder 42. The encoded composite video signal is applied to the monitor 44 and consequently, the through image of the object is displayed on the screen.

The integral values y(i,j) of 256 output from the integration circuit 26f shown in FIG. 2 is fetched by the CPU 32 and set to a register rgst1. The integral values y(i,j) are generated at every one frame of period, and therefore, a setting value of the register rgst1 is renewed at every one frame of period.

When a zoom button 56 is operated, a state signal corresponding thereto is applied from a system controller 52 to the CPU 32. The CPU 32 controls a driver 28a and whereby, the zoom lens 12 is moved to an optical axis direction. The zoom magnification of the through image displayed on the monitor 44 is varied in response to an operation of a zoom button 56.

When a shutter button 54 is half-depressed, a state signal corresponding thereto is applied from the system controller 52 to the CPU 32. The CPU 32 sets the integral values y(i,j) of 256 output from the integration circuit 26f after half-depressing the shutter button 54 to a register rgst2. Consequently, successive two frames of the integral values y(i,j) can be obtained within the registers rgst1 and rgst2. The CPU 32 calculates a possibility that the object scene is a sports scene on the basis of the integral values y(i,j) thus obtained.

After completion of determining a possibility of the sports scene, the CPU 32 performs a focus adjustment. The focus lens 14 moves in the optical axis direction by a driver 28b and set to a focal point. After completion of the focus adjustment, the CPU 32 sets the integral values r(i,j), g(i,j) and b(i,j) output from the integration circuit 26e and the integral values y(i,j) output from the integration circuit 26e in a register rgst3. After completion of fetching one frame of the integral values r(i,j), g(i,j), b(i,j) and y(i,j), the CPU 32 determines possibilities of a portrait scene, an evening scene and a night scene.

The possibility of the portrait scene is calculated on the basis of a distance from the zoom lens 12 to a main object, a distance between the focus lens 14 and the image sensor 20 and the integral values r(i,j), g(i,j) and b(i,j) set in the register rgst3. Furthermore, the possibility of the evening scene is calculated on the basis of the integral values r(i,j), g(i,j), b(i,j) and y(i,j) set in the register rgst3. In addition, the possibility of the night scene is calculated on the basis of the integral values y(i,j) set in the register rgst3.

When the possibilities of the sports scene, the portrait scene, the evening scene and the night scene is thus calculated, a scene having a highest possibility is decided to be an object scene. A camera setting, that is, a photographing mode is varied depending upon a decided scene and a message corresponding to the decided scene is displayed on the monitor 44.

When the sports scene is decided, the CPU 32 corrects a program diagram for exposure adjustment so as to allow an object with motion to be sharply photographed. This makes the photographing mode shift to the sports mode. When the portrait scene is decided, the CPU 32 corrects the program diagram so as to blur away backgrounds and corrects a white balance adjustment gain so as to prevent a change of a skin color of a person. This makes the photographing mode shift to the portrait mode. When the evening scene is decided, the CPU 32 corrects the program diagram so as to allow a distant view to be sharply photographed, and the white balance adjustment gain is corrected to as to prevent a change of a color of sunset. This makes the photographing mode shift to the evening scene mode. When the night scene is decided, the CPU 32 corrects the program diagram so as to highlight illuminations. This makes the photographing mode shift to the night mode.

Whichever scene is decided, the program diagram is corrected. Accordingly, after completion of identifying the scenes, the CPU 32 adjusts an amount of aperture and an exposure time on the basis of the integral values y(i,j) set in the register rgst2 and the corrected program diagram.

When the shutter button 54 is full-depressed after completion of such the exposure adjustment, a state signal corresponding thereto is applied from the system controller 52 to the CPU 32. The CPU 32 performs a photographing process. More specifically, the CPU 32 instructs the TG 30 to perform a main exposure and at a time the main exposure is completed, drives the shutter system 16 by a driver 28d. Driving of the shutter system 16 intercepts an incident light. Furthermore, the CPU 32 instructs the TG 30 to read out all the pixels so as to output from the image sensor 20 one frame of raw image signal obtained by the main exposure. Thus, the raw image signal of 2300 pixels×1740 lines is read from the image sensor 20 by an interlace scan manner.

The raw image signal is applied to the memory control circuit 36 via the CDS/AGC circuit 22 and the A/D converter 24 and written to a raw image area 38b (see FIG. 4) of the SDRAM 38 by the memory control circuit 36. The raw image signal of 2300 pixels×1740 lines is an interlace scan signal and therefore, an odd field signal is stored in a first half of the raw image area 38b and an even field signal is stored in a latter half of the raw image area 38b. That is, the raw image area 38b is formed with an odd filed area and an even filed area.

After completion of writing to the raw image area 38b, the memory control circuit 36 alternately reads the raw image signal from the odd field area and the even field area. Thus, the interlace scan signal is converted into a progressive scan signal. The switch SW1 is connected to a terminal S2 at a time the shutter button 54 is full-depressed. Therefore, the raw image signal read by the memory control circuit 36 is applied to the signal processing circuit 22 via the switch SW1. A series of processes such as color separation, RGB conversion, white balance adjustment and YUV conversion is executed in the signal processing circuit 22, and whereby, the YUV signal of 2300 pixels×1740 lines (primary YUV signal) is generated.

The horizontal zoom magnification and the vertical zoom magnification of the zoom circuit 34 are set to "¼" and "⅙", respectively at a time the shutter button 54 is full-depressed. Therefore, the resolution of the YUV signal output from the signal processing circuit 22 is converted from 2300 pixels× 1740 lines to 575 pixels×290 lines. The YUV signal of 575 pixels×290 lines output from the zoom circuit 34 is written to the display image area 38a shown in FIG. 4 by the memory control circuit 36. Thereafter, the same process as in a case of displaying the through image is performed, and whereby, a freeze image at a time of operating the shutter button 54 is displayed on the monitor 44.

The primary YUV signal of 2300 pixels×1740 lines output from the signal processing circuit 26 is further directly applied to the memory control circuit 36 and written to a primary image area 38c (see FIG. 4) of the SDRAM 38 by the memory control circuit 36. After completion of writing, the CPU 32 creates a resized YUV signal of 160 pixels×120 lines on the basis of the primary YUV signal of 2300 pixels×1740 lines. More specifically, the CPU 32 accesses the SDRAM 38 via the memory control circuit 36 and generates the resized YUV signal by a software process. The generated resized YUV signal is written to the resized image area 38d (see FIG. 4) of the SDRAM 38.

The memory control circuit 36 reads the primary YUV signal and the resized YUV signal from the SDRAM 38 and applies each of YUV signals to a JPEG codec 46. The JPEG codec 46 compresses the applied primary YUV signal and resized YUV signal according to a JPEG format so as to generate a compressed primary YUV signal and a compressed resized YUV signal. The generated compressed primary YUV signal and the compressed resized YUV signal are respectively written to a compressed primary image area 38e and a compressed resized image area 38f (see FIG. 4) by the memory control circuit 36.

After completion of the photographing process, the CPU 32 executes a recording process. More specifically, the CPU 32 accesses the SDRAM 38 via the memory control circuit 36 and reads the compressed primary YUV signal and the compressed resized YUV signal from the compressed primary image area 38e and the compressed resized image area 38f, respectively. The CPU 32 further records on a recording medium 50 the read compressed primary YUV signal and the compressed resized YUV signal in accordance with a file format. It is noted the recording medium 50 is detachable, and access to the recording medium 50 is performed via an I/F 48.

The CPU 32 specifically executes a control program corresponding to flowcharts shown in FIG. 5 to FIG. 12, FIG. 15 to FIG. 16, FIG. 22 to FIG. 24 and FIG. 29 to FIG. 30. It is noted that the control program is stored in a ROM 58.

Figure 5:
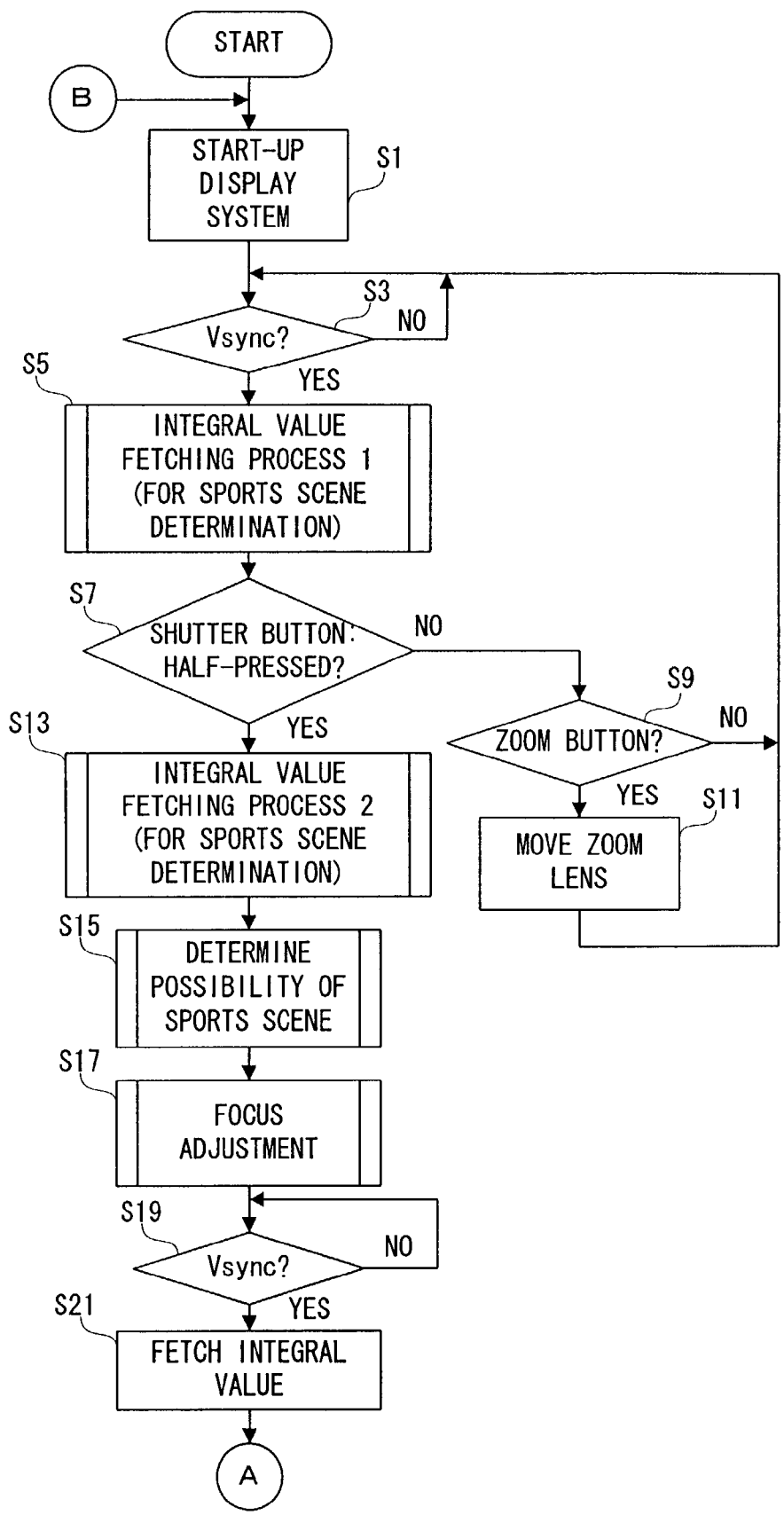
FIG. 5 is a flowchart showing a part of an operation of FIG. 1 embodiment.

First, a display system is started-up in a step S1 shown in FIG. 5. More specifically, the TG 30 is instructed to perform the thin-out reading, and the horizontal zoom magnification and the vertical zoom magnification of the zoom circuit 34 are set to "¼" and "1", respectively. Thus, a through image of the object is displayed on the monitor 44.

It is determined whether or not a vertical synchronization signal of 30 fps is generated from the TG 30 in a step S3, and if "YES", an integral value fetching process 1 is executed in a step S5. Thus, the integral values y(i,j) of 256 respectively corresponding to the blocks of 256 shown in FIG. 3 are set in the register rgst1. It is determined whether or not the shutter button 54 is half-depressed in a step S7, and it is determined whether or not the zoom button 56 is operated in a step S9. When the zoom button 56 is operated, the process proceeds from the step S9 to a step S11 so as to move the zoom lens 12 in the optical axis direction by controlling the driver 28a. After completion of the process in the step S11, the process returns to the step S3.

When the shutter button 54 is half-depressed, "YES" is determined in the step S7 and an integral value fetching process 2 is performed in a step S13. Thus, the integral values y(i,j) of 256 are set in the register rgst2. A possibility of the object scene being the sports scene is determined on the basis of the integral values y(i,j) of successive 2 frames set in the registers rgst1 and rgst2 in a step S15. The possibility is expressed in a percentage.

After completion of the process in the step S15, a focus adjustment is performed in a step S17. More specifically, the focus lens 14 is moved in the optical axis direction by controlling the driver 28b, and whereby, the focus lens 14 is set to a focal point. After completion of the focus adjustment, a vertical synchronization signal is waited and then, the process proceeds from a step S19 to a step S21 so as to fetch the integral values r(i,j), g(i,j), b(i,j) and y(i,j) from the signal processing circuit 26. The fetched integral values r(i,j), g(i,j), b(i,j) and y(i,j) are set in the register rgst3.

In a step S23, a possibility of the object scene being a portrait scene is determined on the basis of the distance from the zoom lens 12 to the main object, the distance between the focus lens 14 and the image sensor 20 and the integral values r(i,j), g(i,j) and b(i,j) set in the register rgst3. In a step S25, a possibility of the object scene being the evening scene is determined on the basis of the integral values r(i,j), g(i,j), b(i,j) and y(i, j) set in the register rgst3. In a step S27, a possibility of the object scene being the night scene is determined on the basis of the integral values y(i,j) set in the register rgst3. It is noted that, similar to the above case, its possibility is expressed in the percentage.

In a step S29, the highest percentage of possibility is specified out of the possibilities required in the steps S15, S23, S25 and S27, and a scene corresponding to the specified possibility is decided to be the object scene. In the step S29, a camera setting (photographing mode setting) corresponding to the decided scene is also performed. When the object scene is decided to be the sports scene, the program diagram is corrected so as to allow the object with motion to be sharply photographed (sports mode setting). When the object scene is decided to be the portrait scene, the program diagram is corrected so as to blur away backgrounds, and a white balance adjustment gain is corrected so as to prevent a change of a skin color of a person (portrait mode setting). When the object scene is decided to be the evening scene, the program diagram is corrected so as to allow a distant view to be sharply photographed, and the white balance adjustment gain is corrected so as to prevent a change of a color of sunset (evening scene mode setting). When the object scene is decided to be the night scene, the program diagram is corrected so as to highlight the illuminations (night scene mode setting).

In a step S31, a character generator (not shown) is driven so as to display a character corresponding to the decided scene on the monitor 44 in an OSD manner. There is a possibility of an error identification of the object scene by an automatic identification, and therefore, an operator is informed which scene is decided by a visual message in this embodiment. This improves operability. It is noted that although a detailed description is omitted, setting of the sports scene, the portrait scene, the evening scene and the night scene is changeable in response to a manual operation by the operator.

In a step S33, an optimal aperture amount and an optimal exposure time are specified on the basis of the integral values y(i,j) set in the register rgst2 and the program diagram corrected by the camera setting in the step S29, and the optimal aperture amount is set to the aperture system 16 by a driver 28c. The shutter system 18 is driven after a lapse of the optimal exposure time from the start of the primary exposure in a step S39 described later.

It is determined whether or not the shutter button 54 is full-depressed in a step S35, and it is determined whether or not the operation of the shutter button 54 is canceled in a step S37. When the shutter button 54 is full-depressed, a photographing/recording process is performed in the step S37, and then, the process returns to the step S1. The object image is recorded on the recording medium 50 by the photographing process and the recording process. When the operation of the shutter button 54 is canceled, the process returns to the step S1 without performing the photographing/recording process.

Figure 7:
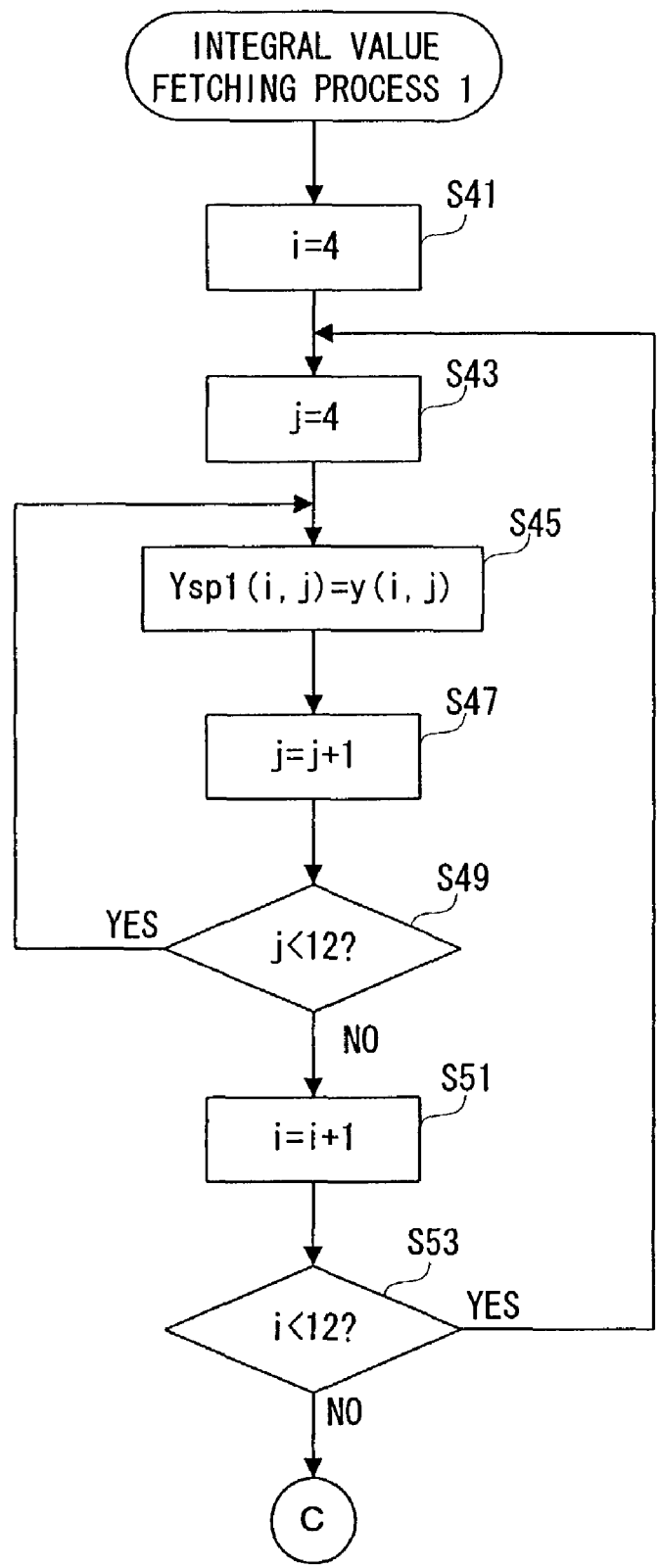
FIG. 7 is a flowchart showing the other part of the operation of FIG. 1 embodiment.
Figure 8:
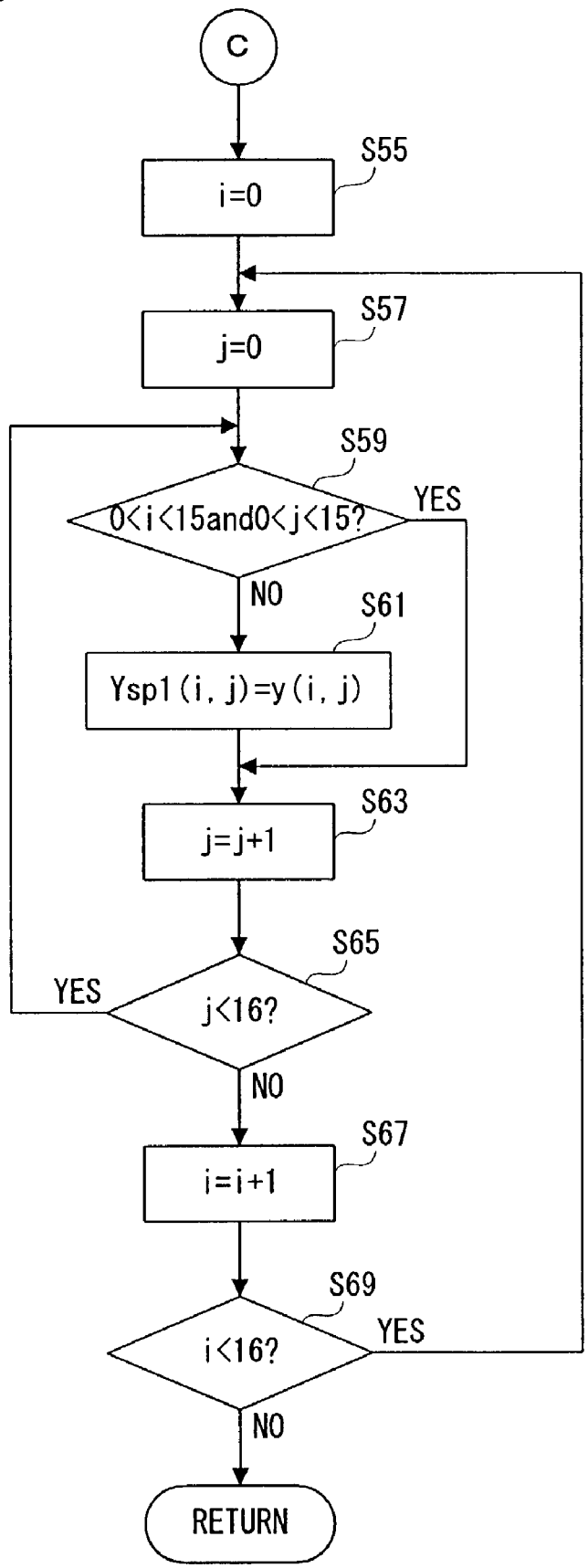
FIG. 8 is a flowchart showing a further part of the operation of FIG. 1 embodiment.

The integral value fetching process 1 in the step S5 complies with a subroutine shown in FIG. 7 and FIG. 8. First, a vertical position number i is set to "4" in a step S41, and a horizontal position number j is set to "4" in a step S43. The integral value y(i, j) is read from the register rgst1 in a step S45, and the integral value y(i,j) is set to a register rgst4 as a specific integral value Ysp1(i,j). The horizontal position number j is incremented in a step S47, and the incremented horizontal position number j is compared with "12" in a step S49. Then, for j<12, the process returns to the step S45 while for j=12, the vertical position number i is incremented in a step S51, and the incremented vertical position number i is compared with "12" in a step S53. Herein, for i<12, the process returns to the step S43 while for i=12, the process proceeds to a step S55.

The vertical position number i is set to "0" in the step S55, and the horizontal position number j is set to "0" in a following step S57. It is determined whether or not the vertical position number i and the horizontal position number j respectively satisfy conditions of 0<i<15 and 0<j<15 in a step S59. When the both conditions are satisfied, the process directly proceeds to a step S63. On the other hand, when any one of the above-described conditions is not satisfied, the integral value y(i,j) of the register rgst1 is set to the register rgst4 as the specific integral value Ysp1(i,j), and then, the process proceeds to the step S63. The horizontal position number j is incremented in the step S63, and the incremented horizontal position number j is compared with "16" in a following step S65. Then, for j<16, the process returns to the step S59 while for j=16, the process proceeds to a step S67. The vertical position number i is incremented in the step S67, and the incremented vertical position number i is compared with "16" in a step S69. Then, for i<16, the process returns to the step S57 while for i=16, the process is restored to an upper hierarchical level of a routine.

Figures 13, 14:
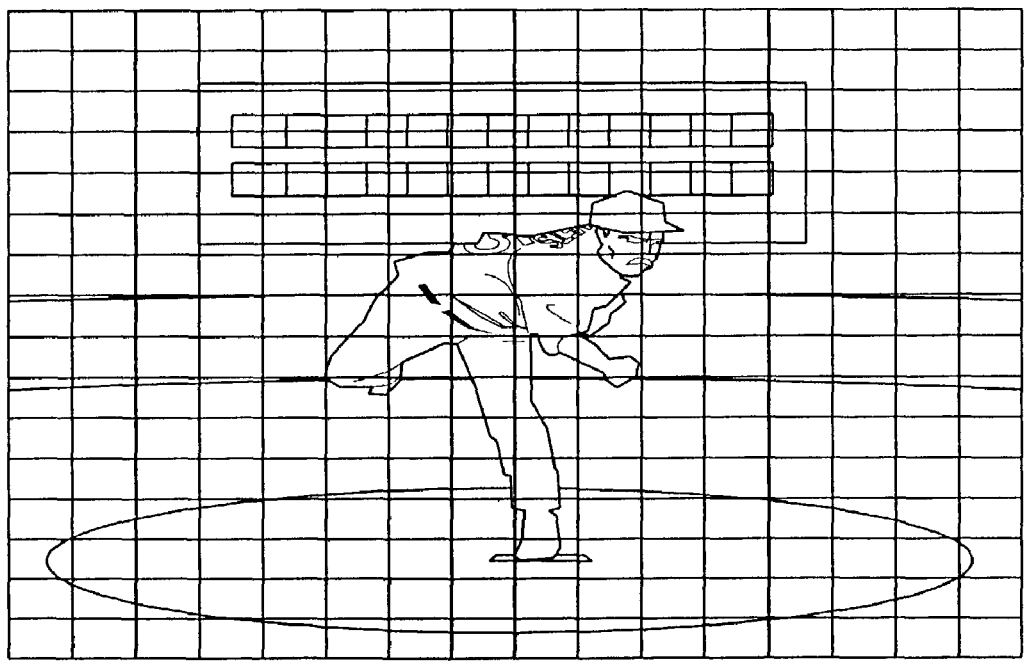
FIG. 13 is an illustrative view showing a part of the operation of FIG. 1 embodiment.
FIG. 14 is an illustrative view showing one example of a sports scene.

Through such the processes, a total of 124 of specific integral values Ysp1(i,j) relating to 64 blocks forming a center area CTR1 and 60 blocks forming a peripheral area PER1 shown in FIG. 13 are required.

Figure 9:
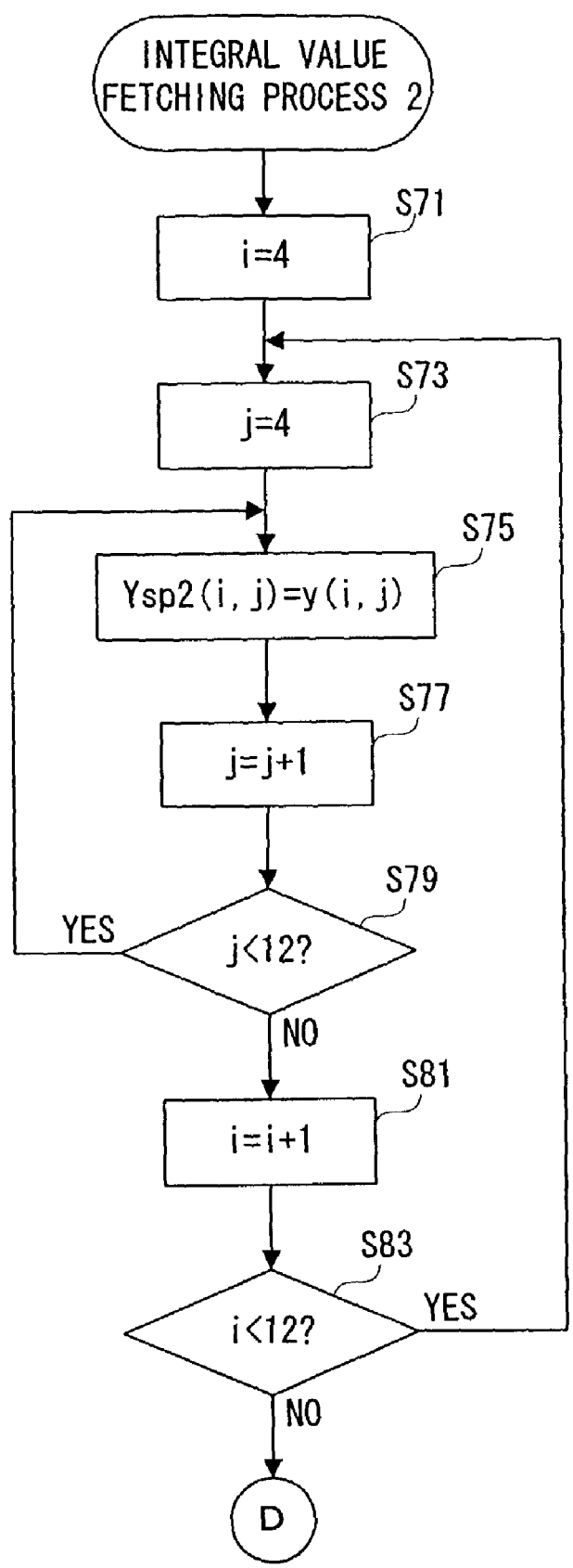
FIG. 9 is a flowchart showing another part of the operation of FIG. 1 embodiment.
Figure 10:
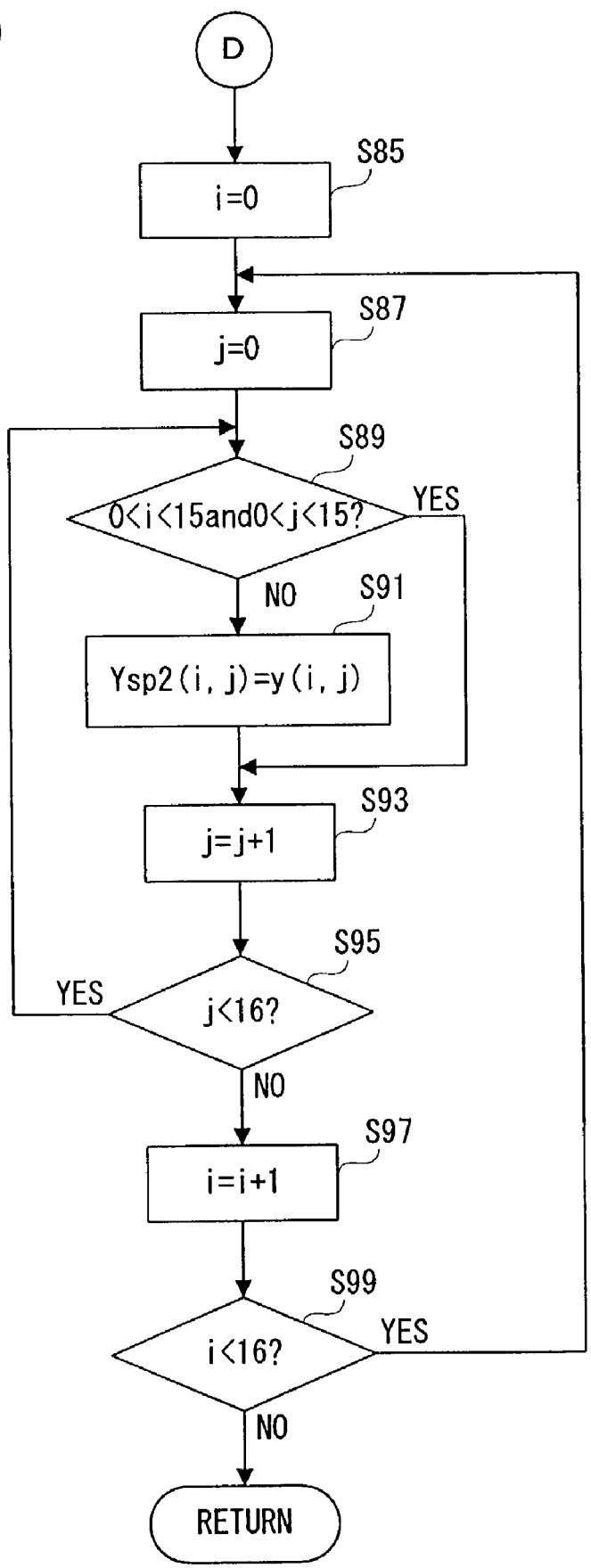
FIG. 10 is a flowchart showing the other part of the operation of FIG. 1 embodiment.

The integral value fetching process 2 in the step S13 shown in FIG. 5 complies with a subroutine shown in FIG. 9 and FIG. 10. It is noted that this subroutine is the same as the subroutine shown in FIG. 7 and FIG. 8 except that the integral value y(i,j) stored in the register rgst2 is set to the register rgst2 as a specific integral value Ysp2(i,j), and therefore, a duplicated description is omitted. Through this process, the specific integral values Ysp2(i,j) of 124 forming the center area CTR1 and a peripheral area PER1 shown in FIG. 13 are required.

Figure 11:
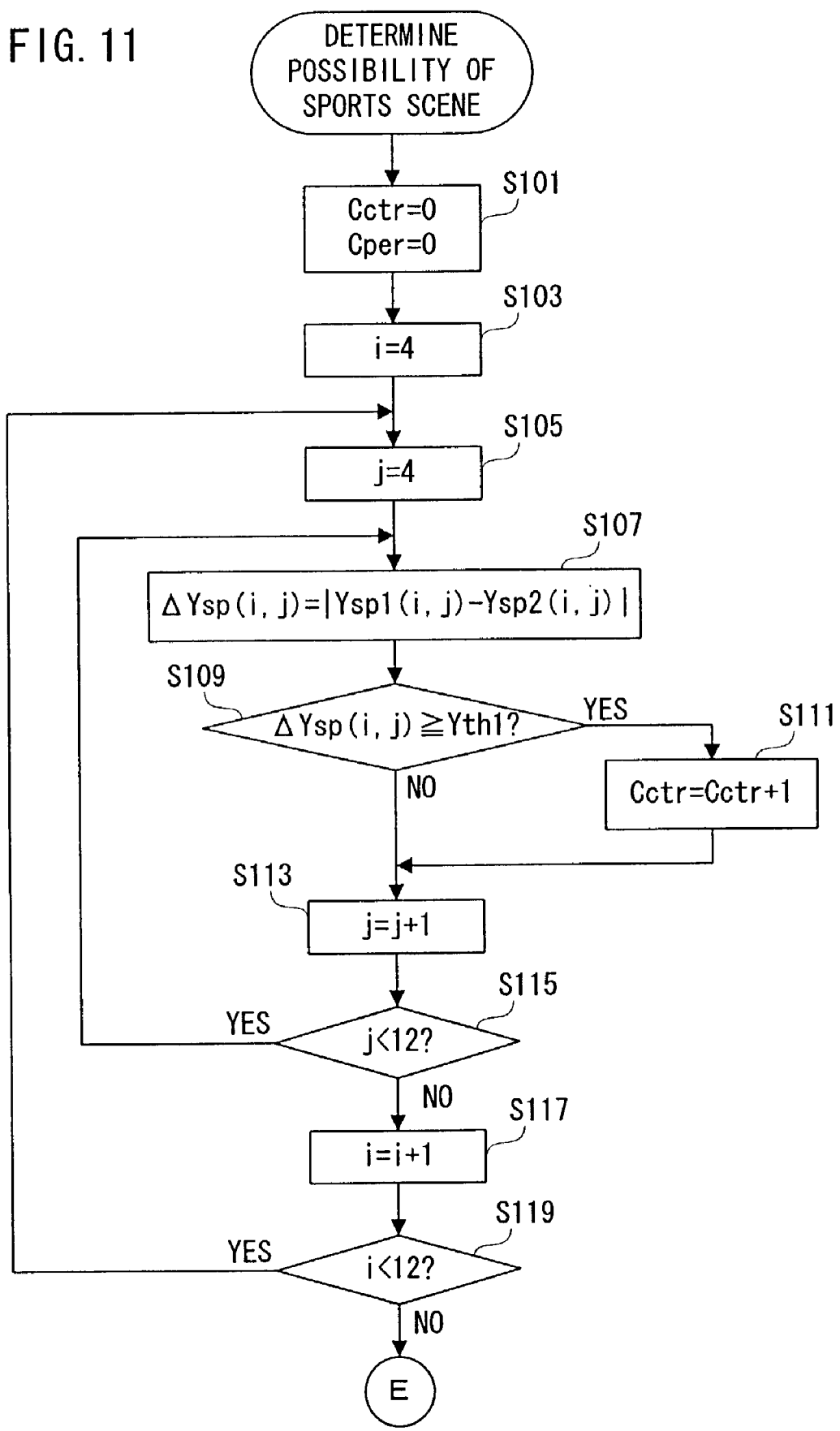
FIG. 11 is a flowchart showing a further part of the operation of FIG. 1 embodiment.
Figure 12:
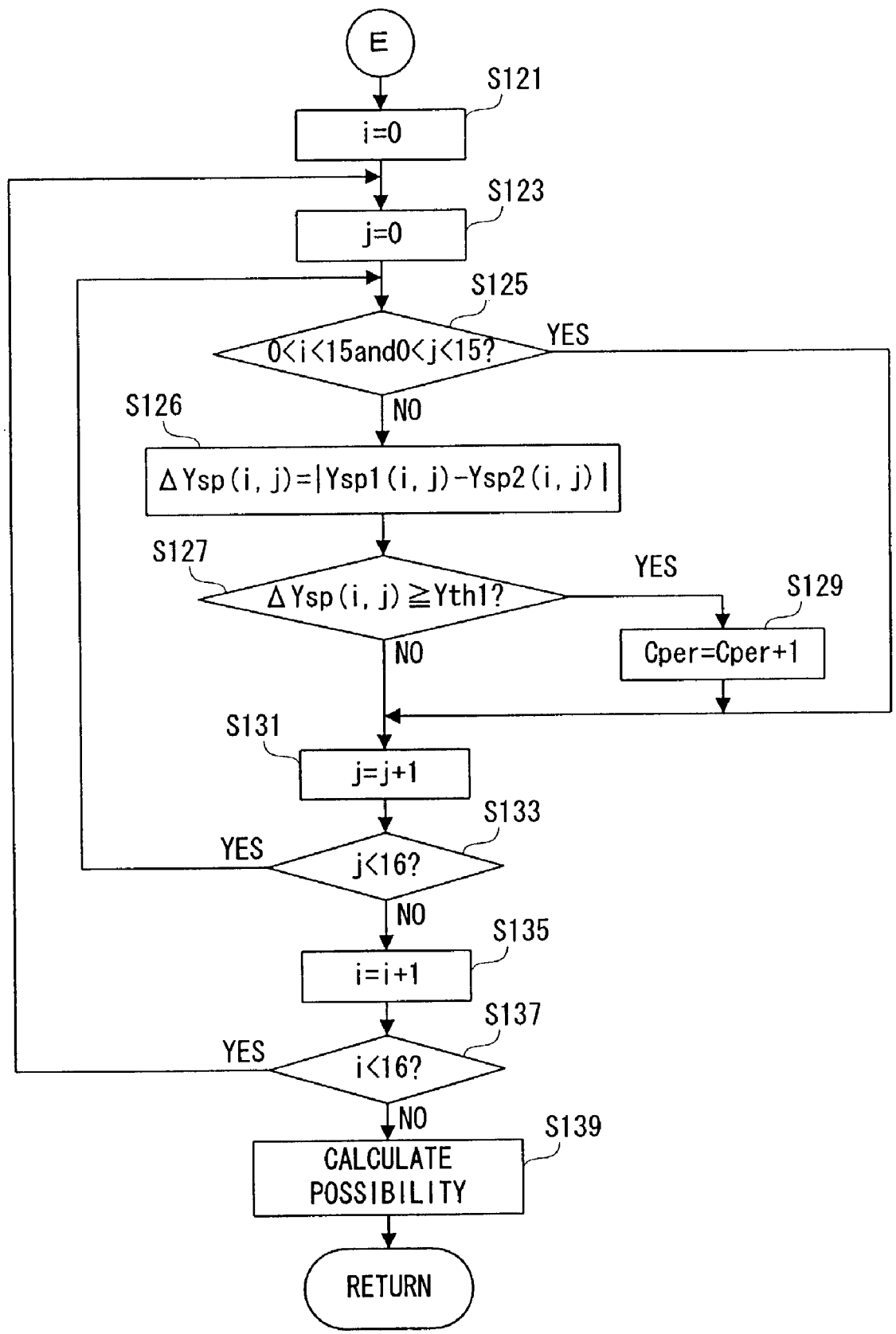
FIG. 12 is a flowchart showing another part of the operation of FIG. 1 embodiment.

A possibility determination process in the step S15 shown in FIG. 5 complies with a subroutine in FIG. 11 and FIG. 12. First, variables Cctr and Cper are set to "0" in a step S101, and the vertical position number i and the horizontal position number j are set to "4" in steps S103 and S105, respectively. A difference absolute value ΔYsp(i,j) between the specific integral value Ysp1(i,j) and Ysp2(i,j) are calculated according to an equation 1 in a step S107, and the calculated difference absolute value ΔYsp(i,j) is compared with a threshold value Yth1 in a following step S109.

$$\Delta Ysp(i,j) = |Ysp1(i,j) - Ysp2(i,j)| \qquad \text{[equation 1]}$$

If $\Delta Ysp(i,j) \geq Yth1$, "YES" is determined in the step S109, and the variable Cctr is incremented in a step S111 and then, the process proceeds to a step S113. On the other hand, if $\Delta Ysp(i,j) < Yth1$, "NO" is determined in the step S109, and the process directly proceeds to the step S113.

The horizontal position number j is incremented in the step S113, and the incremented horizontal position number j is compared with "12" in a step S115. Then, if j<12, the process returns to the step S107 while if j=12, the process proceeds to a step S117. The vertical position number i is incremented in the step S117, and the incremented vertical position number i is compared with "12" in a step S119. Then, if i<12, the process returns to the step S105, and if i=12, the process proceeds to a step S121.

The difference absolute values $\Delta Ysp(i,j)$ calculated in the step S107 is corresponding to a moving amount of the object in each block forming the center area CTR1. If the moving amount is large, "YES" is determined in the step S109, and the variable Cctr is incremented. Accordingly, as a ratio of an object having a large moving amount to the center area CTR1 is large, the variable Cctr indicates a large value.

The vertical position number i is set to "0" in the step S121, and the horizontal position number j is set to "0" in a following step S123. It is determined whether or not the vertical position number i and the horizontal position number j satisfy 0<i<15 and 0<j<15, respectively, and if both conditions are satisfied, the process proceeds to a step S131 while any one of the conditions is not satisfied, the process directly proceeds to a step S126. The difference absolute value $\Delta Ysp(i,j)$ between the specific integral values Ysp1(i,j) and Ysp2(i,j) is calculated according to the above-described equation 1 in the step S126, and the calculated difference absolute value $\Delta Ysp(i,j)$ is compared with a threshold value Yth1 in a following step S127. Then, if $\Delta Ysp(i,j) \geq Yth$, a variable Cper is incremented in the step S129, and then, the process proceeds to a step S131 while if $\Delta Ysp(i,j) < Yth$, the process directly proceeds to the step S131.

The horizontal position number j is incremented in the step S131, and the incremented horizontal position number j is compared with "16" in a step S133. Then, if j<16, the process returns to the step S125 while if j=16, the process proceeds to a step S135. The vertical position number i is incremented in the step S135, and the incremented vertical position number i is compared with "16" in a step S137. Then, if i<16, the process returns to the step S123, and if i=16, the process proceeds to a step S139.

The difference absolute value $\Delta Ysp(i,j)$ calculated in the step S126 is corresponding to a moving amount of the object in each block (i,j) forming the peripheral area PER1. If the moving amount is large, "YES" is determined in the step S127, and the variable Cper is incremented. Accordingly, as a ratio of an object having a large moving amount to the peripheral area PER1 is large, the variable Cper indicates a large value.

In the step S139, a possibility Psprt that is a possibility the object scene being the sports scene is calculated according to equations 2 to 4. When the possibility Psprt is calculated, the process is restored to an upper hierarchical level of a routine.

$Rcrt = Cctr/64*100$ [equation 2]

$Rper = Cper/60*100$ [equation 3]

$Psprt = Rctr - a*Rper$ [equation 4]

a: constant

The number of blocks forming the center area CTR1 is "64", and the number of blocks forming the peripheral area PER1 is "60". Therefore, when the variable Cctr is divided by "64" and the divided value is multiplied by "100", a ratio Rctr of an object having a large moving amount to the center area CTR1 is required. Furthermore, when the variable Cper is divided by "60" and the divided value is multiplied by "100", a ratio Rper of an object having a large moving amount to the peripheral area PER1 is required. Since there is a need to exclude a movement of a whole object scene for the purpose of identifying a movement of only the object existing in the center area CRT1, the ratio Rper is multiplied by the constant a, and the multiplied value a * Rper is subtracted from the ratio Rctr. Thus, the possibility Psprt is required as a percentage. When photographing a scene in which a baseball pitcher throws a ball as shown in FIG. 14, the possibility Psprt indicates a high numeral value.

Figure 6:
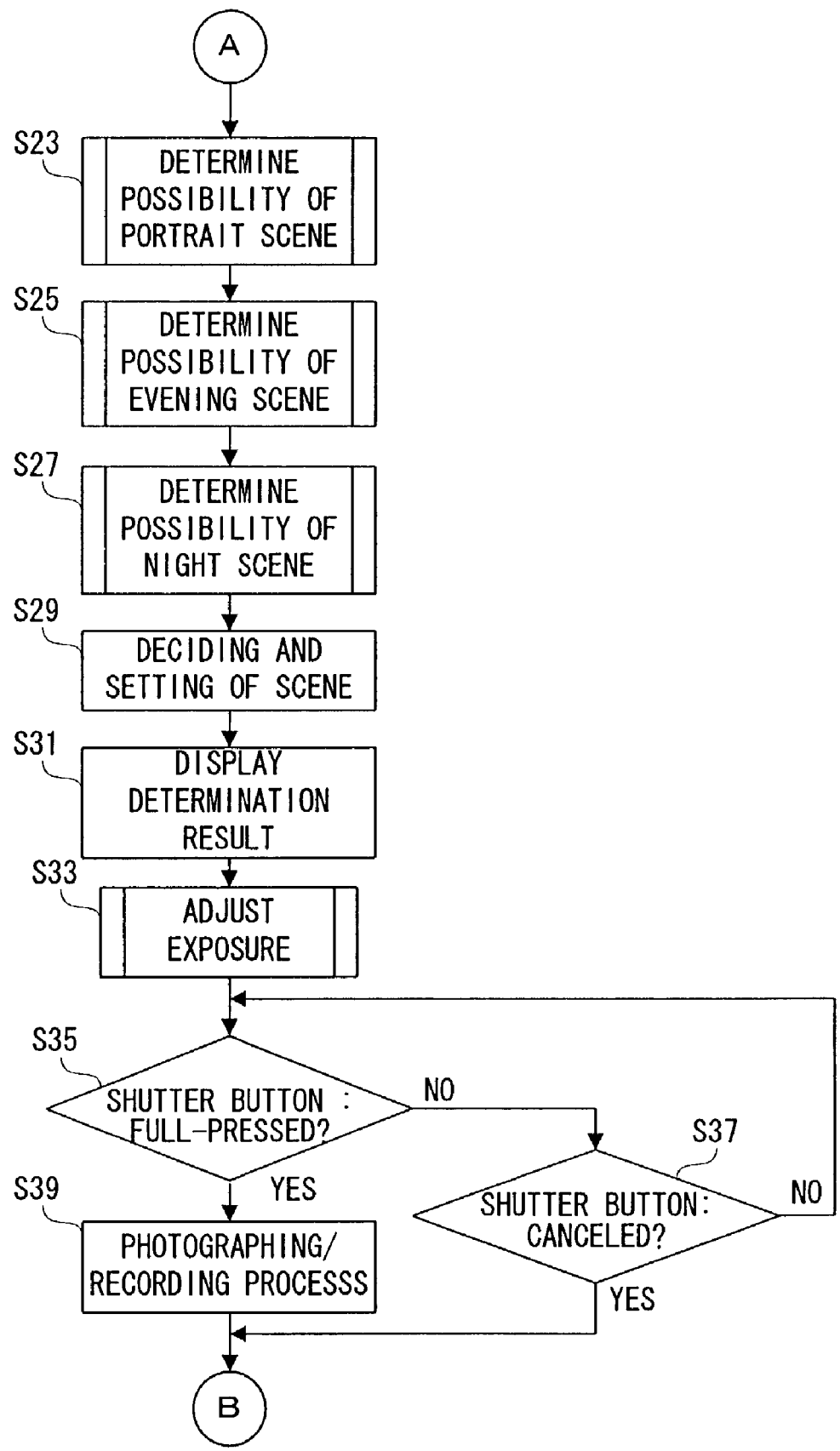
FIG. 6 is a flowchart showing another part of the operation of FIG. 1 embodiment.
Figure 15:
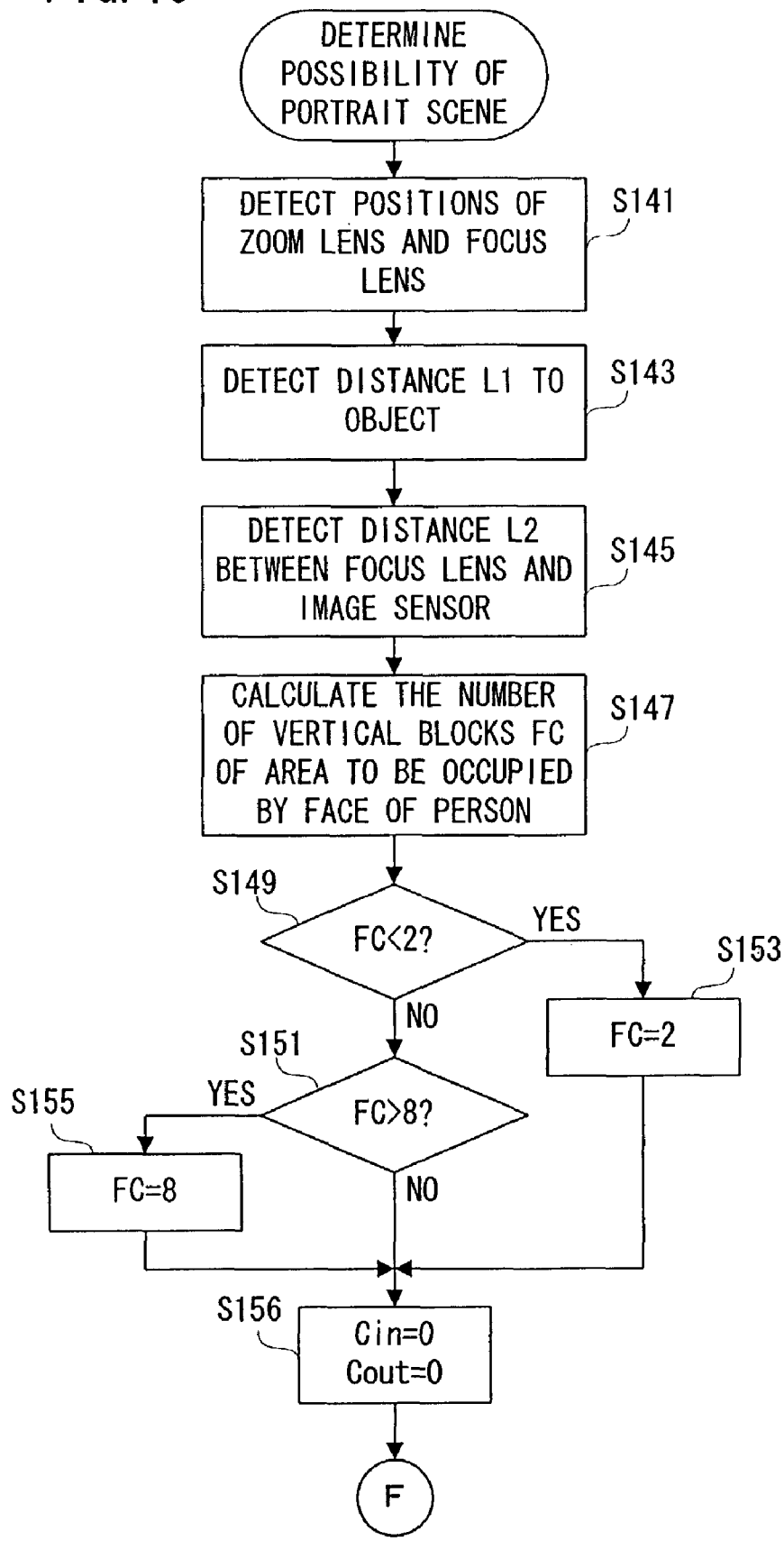
FIG. 15 is a flowchart showing a part of the operation of FIG. 1 embodiment.
Figure 16:
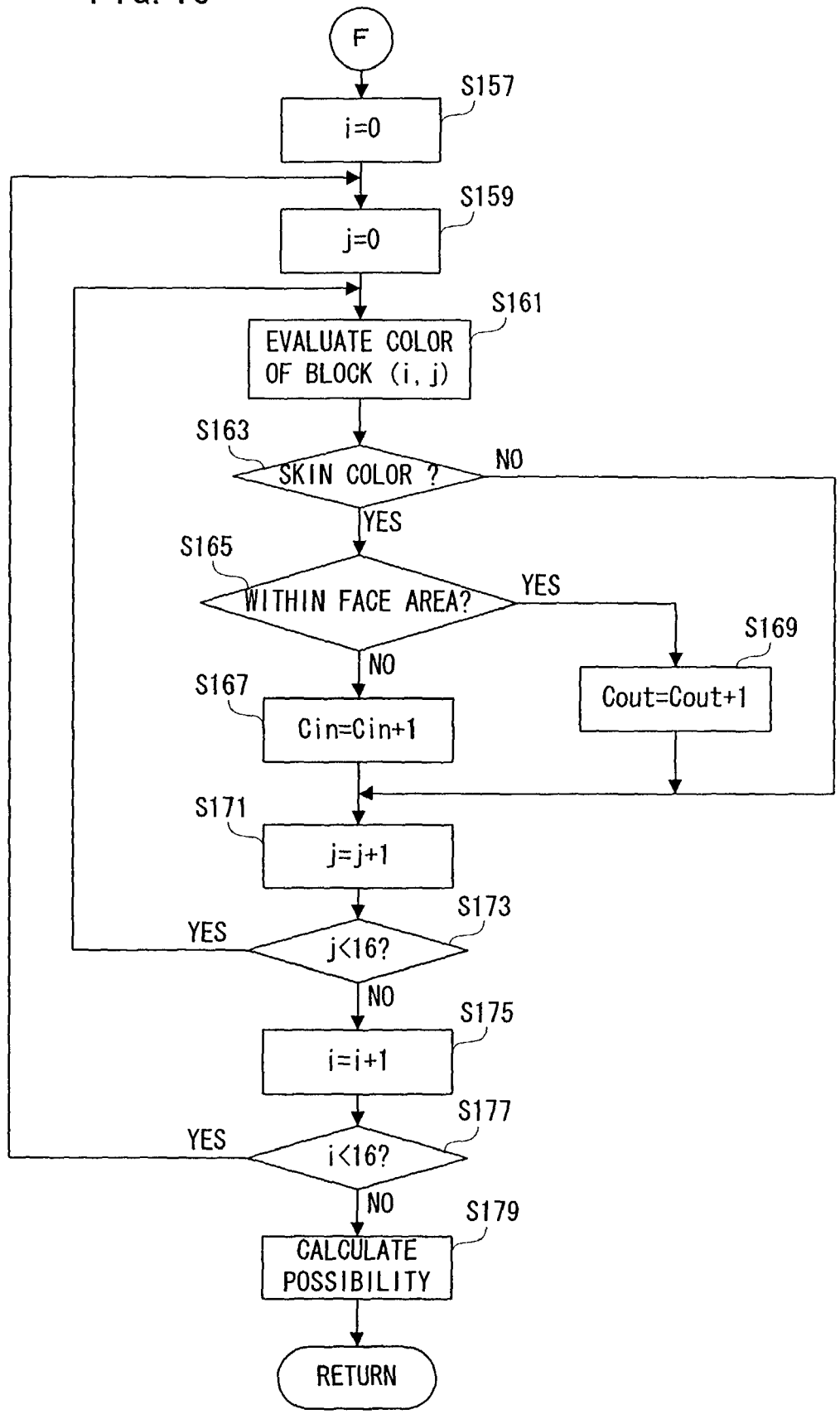
FIG. 16 is a flowchart showing another part of the operation of FIG. 1 embodiment.

A possibility determination process in the step S23 shown in FIG. 6 complies with a subroutine shown in FIG. 15 and FIG. 16. First, positions of the zoom lens 12 and the focus lens 14 are detected in a step S141, and a distance L1 from the zoom lens 12 to the main object and a distance L2 between the focus lens 14 and the image sensor 20 are detected in steps S143 and step S145, respectively (see FIG. 18).

Figure 17:
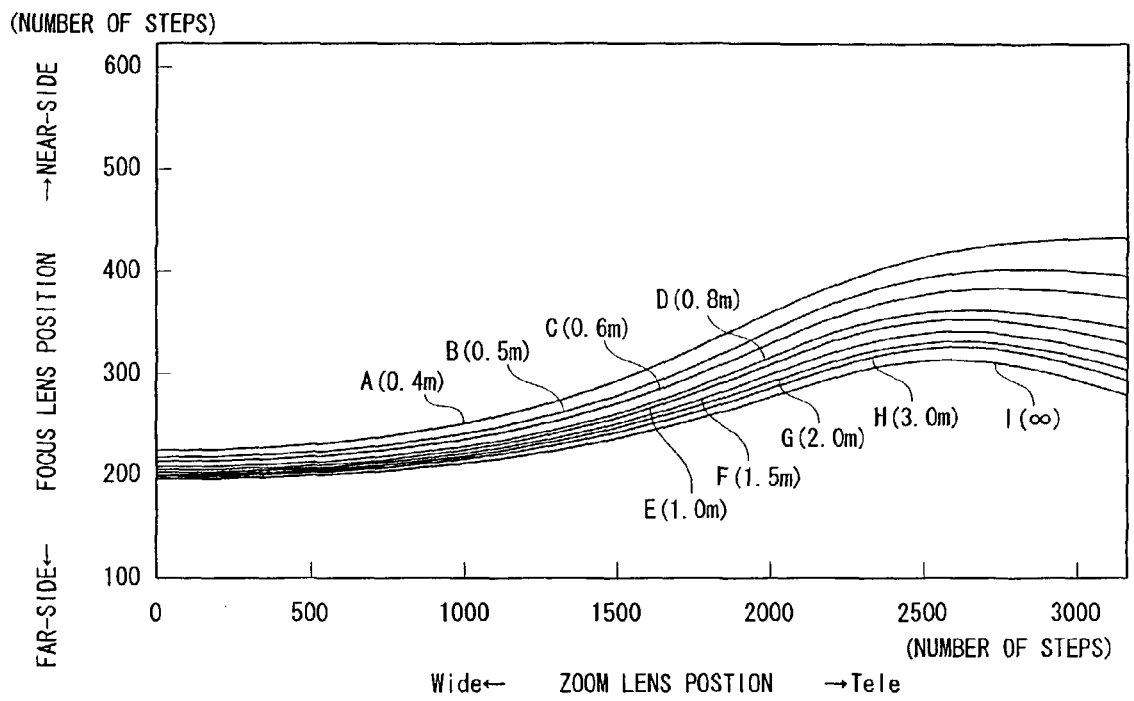
FIG. 17 is a graph showing a relationship between a zoom lens position, a focus lens position and a distance to an object.

The ROM 58 is stored with a graph shown in FIG. 17. According to FIG. 17, a horizontal axis and a vertical axis are positions of the zoom lens 12 and the focus lens 14, respectively. The position of the zoom lens 12 is expressed by the number of the steps of the stepping motor (not shown) provided in the driver 28a, and the position of the focus lens 14 is expressed by the number of the steps of the stepping motor (not shown) provided in the driver 28b. A plurality of curves A to I depending upon distances to the main object are depicted on a plane formed by the vertical axis and the horizontal axis. Each of the curves A to I indicates a relation of lens positions when distances to the object is 0.4 m, 0.5 m, 0.6 m, 0.8 m, 1.0 m, 1.5 m, 2.0 m, 3.0 m and an infinity far ($\infty$), respectively.

Accordingly, in the step S143, the distance L1 is detected on the basis of the positions of the zoom lens 12 and the focus lens 14 required in the step S141 and the graph shown in FIG. 17. Furthermore, in the step S145, the distance L2 is detected from the position of the focus lens 14 required in the step S141.

In a step S147, the number of the vertical blocks FC (face area) to be occupied by a face of a person on the screen, that is, the object scene is calculated according to equations 5 to 6.

$face2 = face1 * L2/L1$ [equation 5]

face1: length of a face of a person (constant: 30 cm)
face2: length of a face image formed on a light-receiving surface $FC = 16 * face2/h$ [equation 6]

h: a vertical size of the face image formed on the light receiving surface

Figure 18:
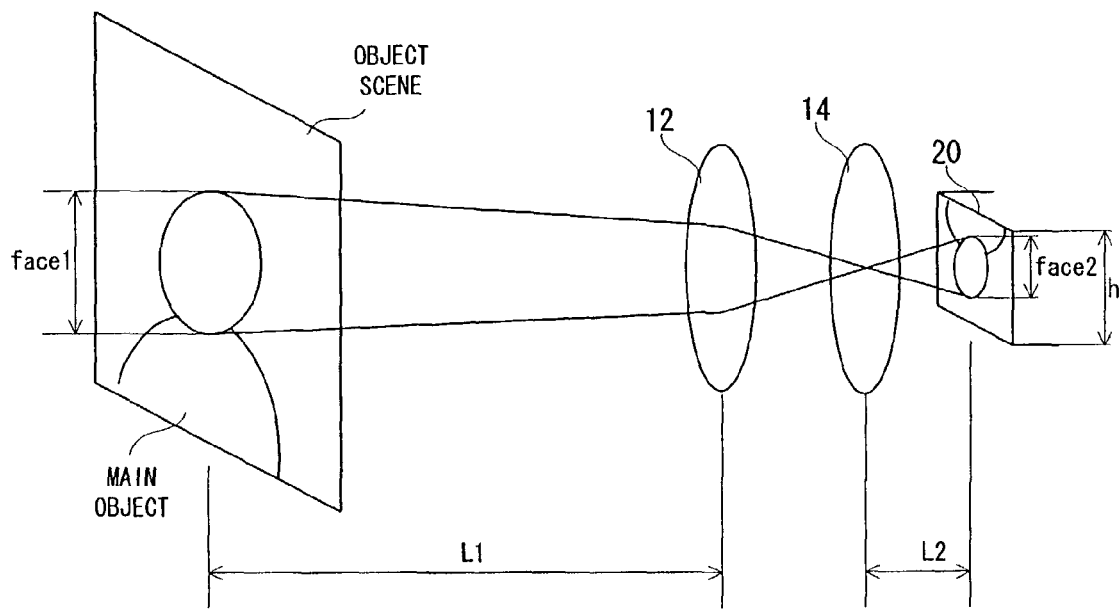
FIG. 18 is an illustrative view showing a part of the operation of the FIG. 1 embodiment.

Referring to FIG. 18, on the assumption that a person (main object) having the face length of face1 exists at a position away from the zoom lens 12 by a distance L1, the length face 2, that is, the length of a face image projected on the light receiving surface is equal to a value multiplying the face1 by L2/L1. In addition, the number FC, that is, the number of the vertical blocks of the face area projected on the light receiving surface is equal to a value required by dividing the face 2 by the vertical size h of the light receiving surface and multiplying the divided value by "16".

Returning to FIG. 15, the number of the vertical blocks FC calculated is determined in steps S149 and S151. If the number of the vertical blocks FC is lower than "2", the number of the vertical blocks FC is set to "2" in a step S153 and then, the process proceeds to a step S156. In a case the number of the vertical blocks FC is higher than "8", the number of the vertical blocks FC is set to "8" in a step S155 and then, the process proceeds to the step S156. On the other hand, when a condition of $2 \leq FC \leq 8$ is satisfied, the process directly proceeds to the step S156. Thus, an area of the face area is set to in a range of 2 blocks×2 blocks to 8 blocks×8 blocks.

Variables Cin and Cout are set to "0" in the step S156, and the vertical position number i and the horizontal position number j are set to "0" in steps S157 and S159, respectively. In a step S161, the integral values r(i,j), g(i,j), and b(i,j) set in the register rgst3, are read so as to calculate color evaluation values R and G of the block (i,j) according to an equation 7.

$$R=r(i,j)/(r(i,j)+g(i,j)+b(i,j))$$

$$G=g(i,j)/(r(i,j)+g(i,j)+b(i,j)) \quad \text{[equation 7]}$$

Figures 19, 20:
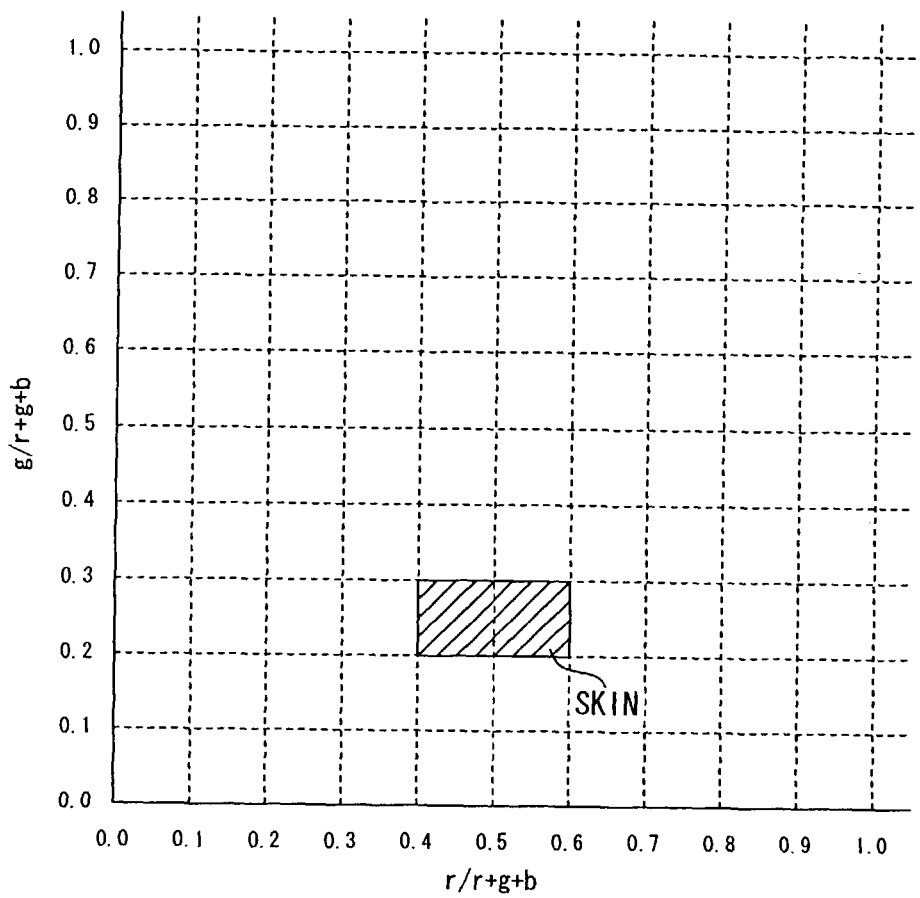
FIG. 19 is an illustrative view showing a distribution state of color evaluation values.
FIG. 20 is an illustrative view showing a part of the operation of FIG. 1 embodiment.

It is determined whether or not the calculated color evaluation values R and B belong to a skin color area SKN shown in FIG. 19 in a step S163, and if "NO", the process directly proceeds to a step S171. On the other hand, if "YES" in the step S163, the process proceeds to a step S165 so as to determine whether or not the block (i,j) belong to the face area defined by the size required in the steps S147 to S155. More specifically, it is determined whether or not both conditions shown in equations 8 and 9 are satisfied. Then, if both the conditions are satisfied, the block (i,j) is determined to belong to the face area, and if any one of these conditions is not satisfied, it is determined the block (i,j) does not belong to the face area.

$$8-FC/2 \leq i \leq 7+FC/2 \quad \text{[equation 8]}$$

$$8-FC/2 \leq j \leq 7+FC/2 \quad \text{[equation 9]}$$

According to the equations 8 and 9, the face area is formed in the center of the screen. For example, if FC=6, an area FACE diagonally shaded in FIG. 20 is made to be the face area. If the block (i,j) belongs to such the face area, the variable Cin is incremented in a step S167, and then, the process proceeds to the step S171 while if the block (i,j) does not belong to the face area, the variable Cout is incremented in a step S169, and then, the process proceeds to the step S171.

The horizontal position number j is incremented in the step S171, and the incremented horizontal position number j is compared with "16" in a step S173. Then, for j<16, the process returns to the step S161 while for j=16, the process proceeds to a step S175. The vertical position number i is incremented in the step S175, and the incremented vertical position number i is compared with "16" in a step S177. Then, for i<16, the process returns to the step S159 while for i=16, the process proceeds to a step S179. By executing such a process, the variable Cin indicates the number of skin color blocks belonging to the face area, and the variable Cout indicates the number of skin color blocks not belonging to the face area.

In the step S179, a possibility Pptrt that the object scene is the portrait scene is calculated according to an equation 10. When the possibility Pptrt is calculated, the process is restored to an upper hierarchical level of a routine.

$$Pptrt=(Cin-Cout*n)/FC^2*100 \quad \text{[equation 10]}$$

n: constant

Figure 21:
FIG. 21 is an illustrative view showing one example of a portrait scene.
Figure 22:
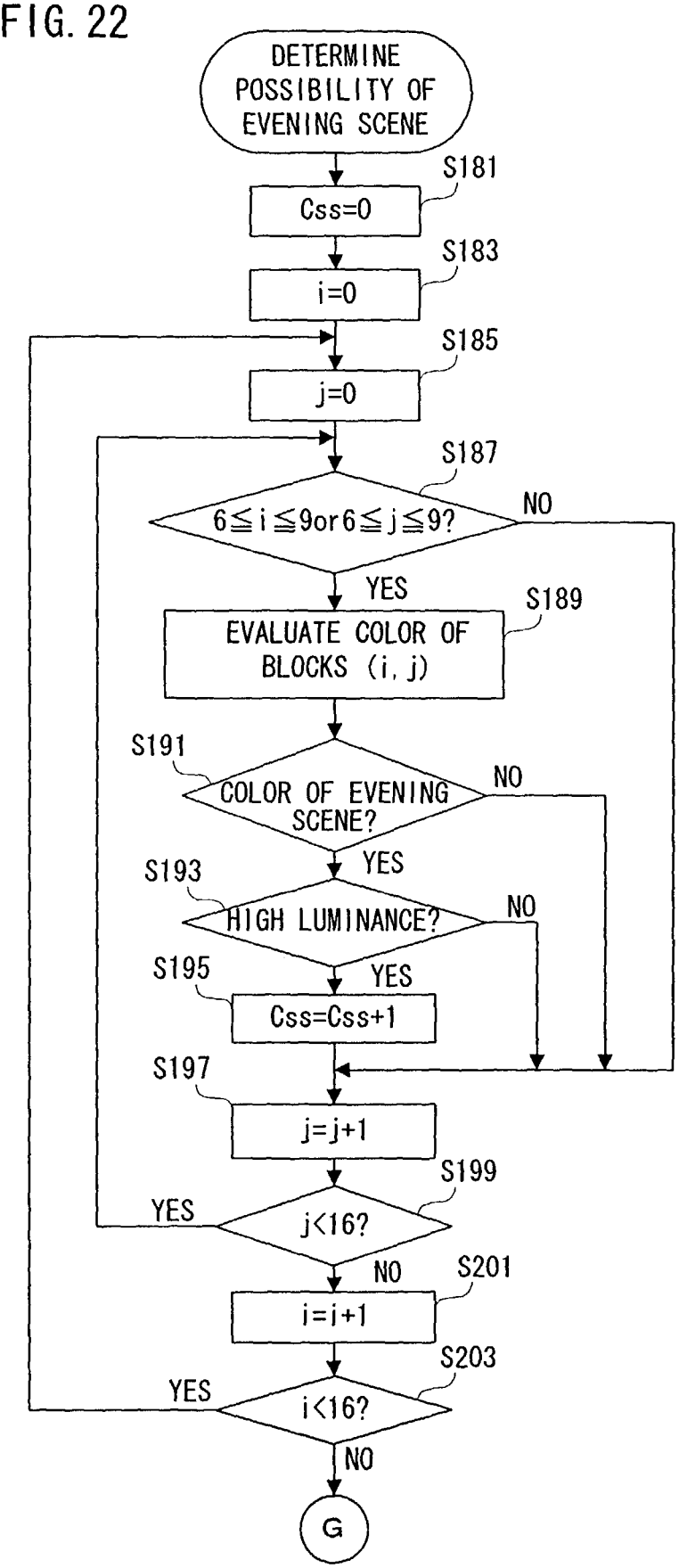
FIG. 22 is a flowchart showing a part of the operation of FIG. 1 embodiment.

The larger the number of the skin color blocks belonging to the face area is, the higher the possibility that the object is a face of a person is, and the smaller the number of the skin color blocks belonging to the face area is, the lower the possibility that the object is the face of the person is. It is noted that larger the number of the skin color blocks belonging to an area except for the face area, the lower the possibility that the object is the face of the person is. This is a reason why a multiplied value required by multiplying the variable Cout by the constant n is subtracted from the variable Cin. On the other hand, $FC^2$ is the total number of the blocks belonging to the face area. When the subtracted value is divided by the total number of the blocks, and the divided value is multiplied by "100", the possibility Pptrt that is a possibility of the object scene being the portrait scene is required as a percentage. It is noted that when photographing a scene in which a person exists in the center of the screen as shown in FIG. 21, the possibility Pptrt indicates a high numeral value.

The possibility determination process in the step S25 shown in FIG. 6 complies with a subroutine shown in FIG. 11 and FIG. 12. First, a variable Css is set to "0" in a step S181, the vertical position number i is set to "0" in a step S183, and the horizontal position number j is set to "0" in a step S185. It is determined whether or not the vertical position number i and the horizontal position number j satisfy conditions of $6 \leq i \leq 9$ and $6 \leq j \leq 9$, respectively in a step S187. Then, if neither condition is satisfied, the process proceeds to a step S197 while at least any one of the conditions is satisfied, the process proceeds to a step S189.

Figure 27:
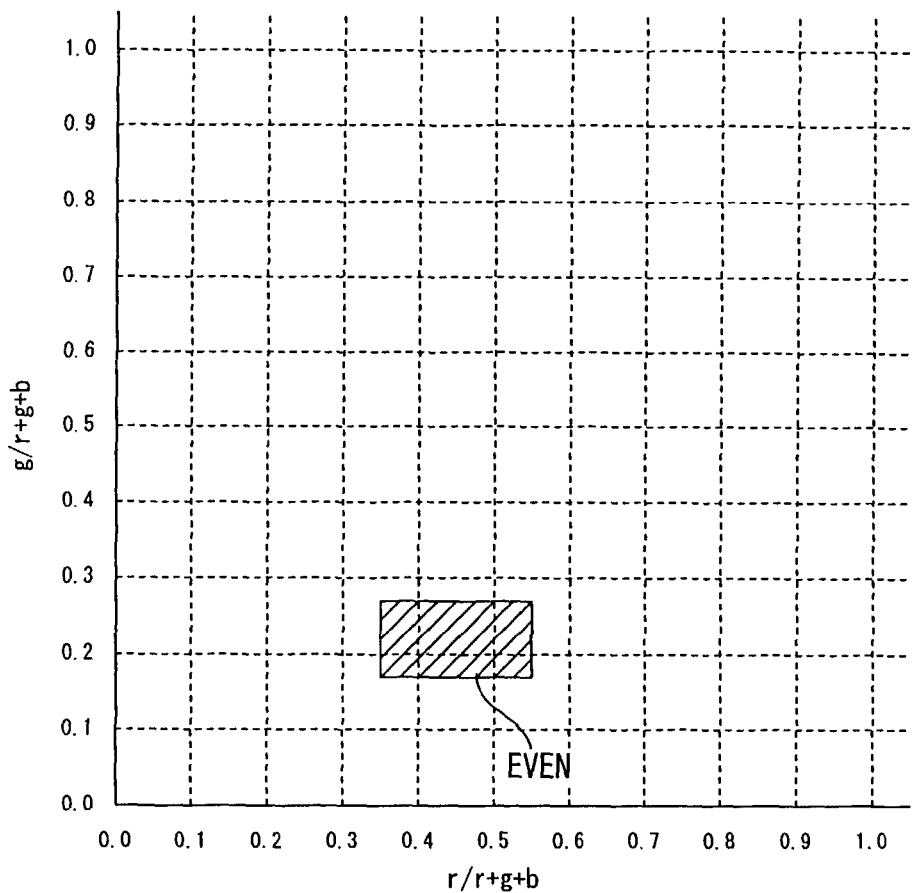
FIG. 27 is an illustrative view showing a distribution state of color evaluation values.

In the step S189, the integral values r(i,j), g(i,j), and b(i,j) set in the register rgst3 are read, and the color evaluation values R and G of the block (i,j) are calculated according to the above-described equation. It is determined whether or not the calculated color evaluation values R and G belong to the evening scene color area EVEN diagonally shaded in FIG. 27 in a step S191, and if "NO" is determined, the process proceeds to a step S195 while if "YES" is determined, the process proceeds to a step S193. In the step S193, the integral value y(i,j) set in the register rgst3 is read, and it is determined whether or not the integral value y(i,j) is a high luminance value. More specifically, it is determined whether or not the integral value y(i,j) is higher than a threshold value Yth2. Then, if $y(i,j) \leq Yth2$, the process directly proceeds to a step S197 while if y(i,j)>Yth2, the variable Css is incremented in the step S195 and then, the process proceeds to the step 197.

The horizontal position number j is incremented in the step S197, and the incremented horizontal position number j is compared with "16" in a step S201. If j<16, the process returns to the step S187 while if j=16, the process proceeds to the step S201. The vertical position number i is incremented in the step S201, and the incremented vertical position number i is compared with "16" in a step S203. Then, if i<16, the process returns to the step S185 while if i=16, the process proceeds to a step S205.

By executing such the process, a determination process whether the evening scene color or not and a determination process whether high luminance or not are performed as to each of blocks forming a cross area CRS1 diagonally shaded in FIG. 25. The variable Css indicates the number of the blocks having the evening scene color and the high luminance value.

Figure 23:
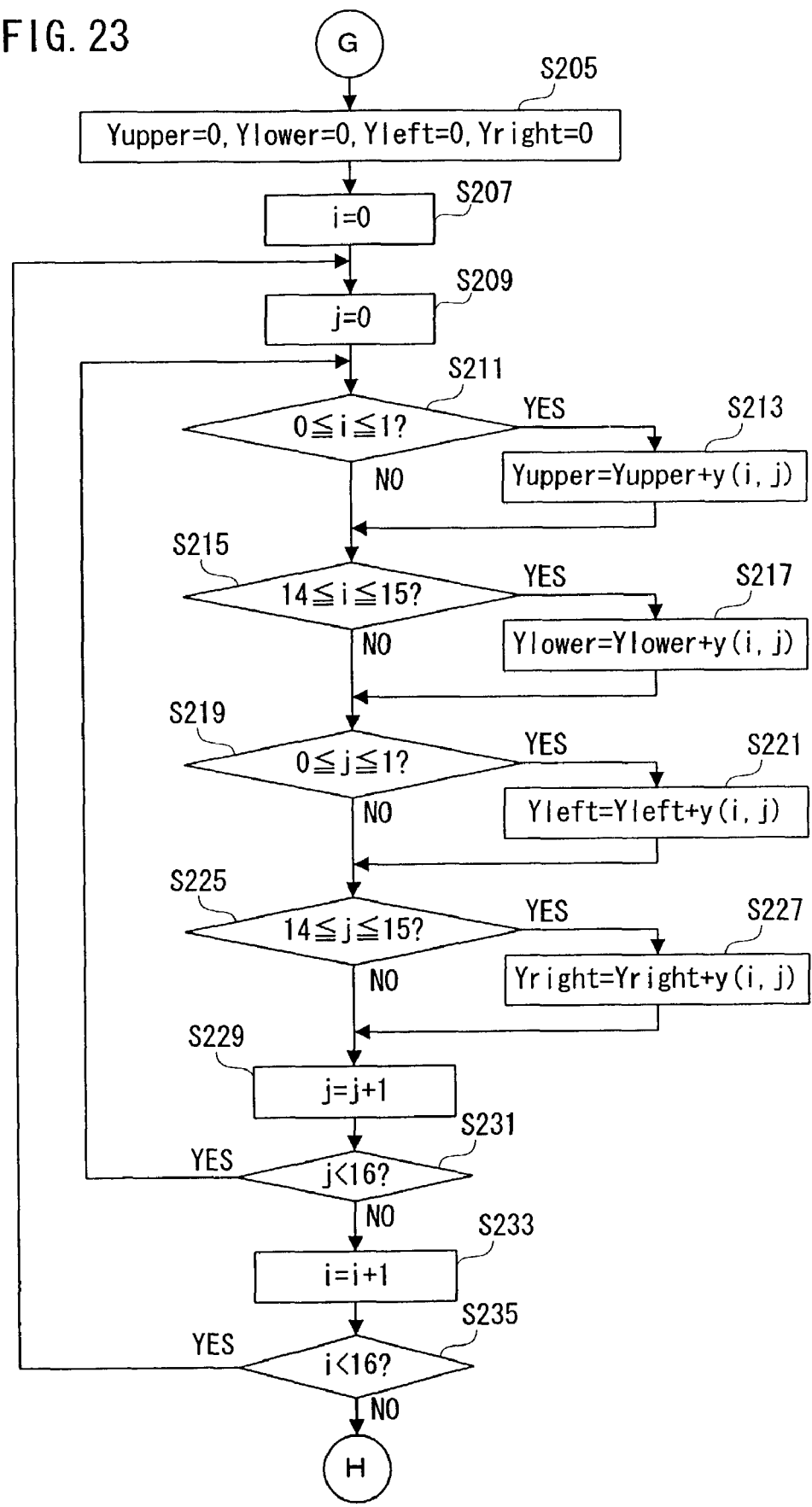
FIG. 23 is a flowchart showing another part of the operation of FIG. 1 embodiment.
Figure 24:
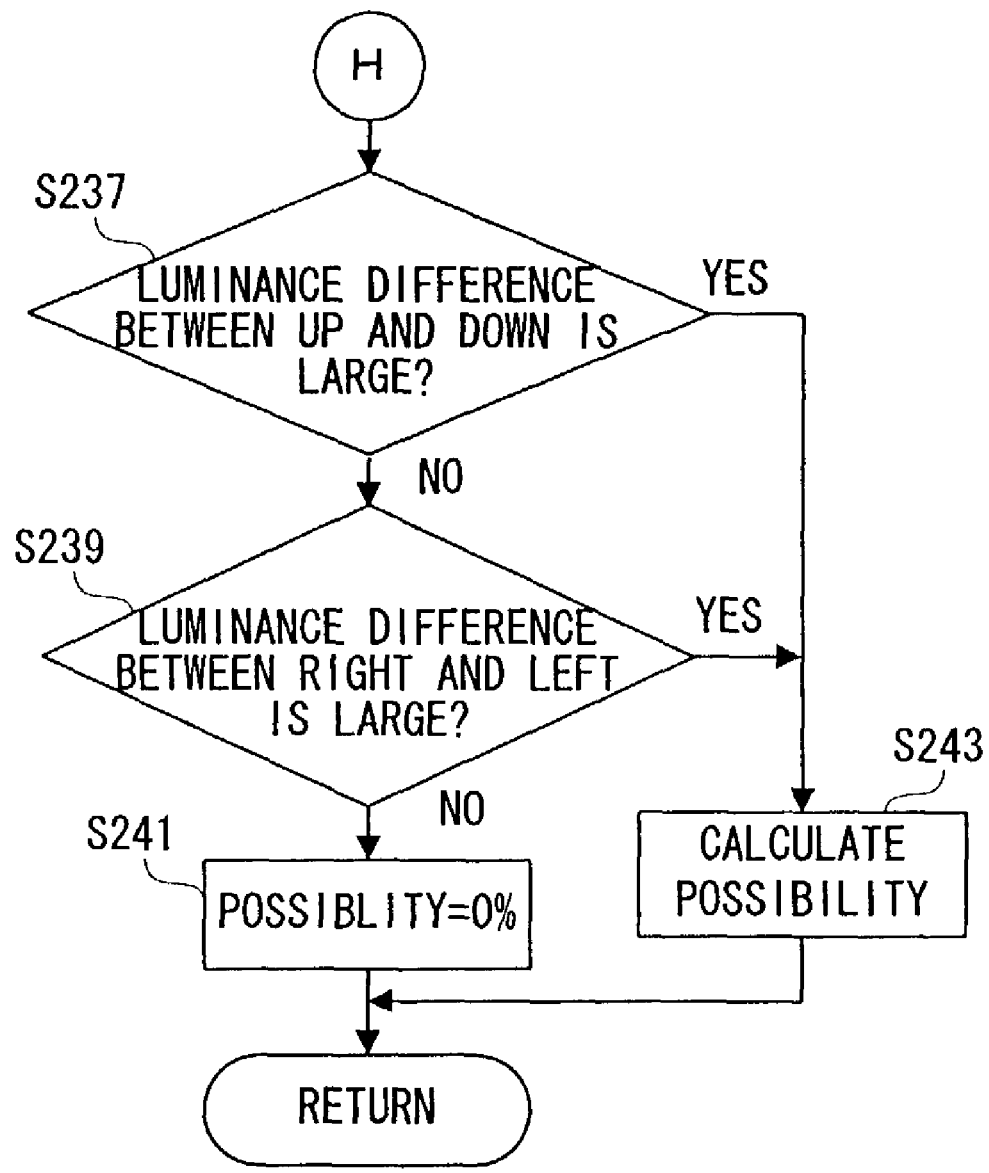
FIG. 24 is a flowchart showing the other part of the operation of FIG. 1 embodiment.

In the step S205 shown in FIG. 23, the peripheral luminance values Yupper, Ylower Yleft and Yright are set to "0", respectively. The vertical position number i and the horizontal position number j are set to "0" in steps S207 and S209, respectively. It is determined whether or not a condition of $0 \leq i \leq 1$ is satisfied in a step S211, it is determined whether or not a condition of $14 \leq i \leq 15$ is satisfied in a step S215, it is determined whether or not a condition of $0 \leq j \leq 1$ is satisfied in a step S219 and it is determined whether or not $14 \leq j \leq 15$ is satisfied in a step S225.

If "YES" is determined in the step S211, the process proceeds to a step S213 so as to add the integral value y(i,j) stored in the register rgst3 to the peripheral luminance value Yupper. If "YES" is determined in the step S215, the process proceeds to the step S217 so as to add the integral value y(i,j) stored in the register rgst3 to the peripheral luminance value Ylower. If "YES" is determined in the step S219, the process proceeds to a step S221 so as to add the integral value y(i,j) stored in the register rgst3 to the peripheral luminance value Yleft. If "YES" is determined in the step S225, the process proceeds to a step S227 so as to add the integral value y(i,j) stored in the register rgst3 to the peripheral luminance value Yright.

The horizontal position number j is incremented in a step S229, and the incremented horizontal position number j is compared with "16" in a step S231. Then, if j<16, the process returns to the step S211 while if j=16, the process proceeds to a step S233. The vertical position number i is incremented in the step S233, and the incremented vertical position number i is compared with "16" in a step S235. Then, if i<16, the process returns to the step S209 while if i=16, the process proceeds to a step S237.

The peripheral luminance values Yupper, Ylower Yleft and Yright required by such the process respectively indicate luminance of peripheral areas PER2$a$, PER2$b$, PER2$c$ and PER2$d$ indicated by oblique lines and heavy lines in FIG. 26.

In the step S237, a difference between the peripheral luminance values Yupper and Ylower is detected, and it is determined whether or not a luminance difference between upper and lower of the screen is large on the basis of the difference. In a step S239, a difference between the peripheral luminance values Yleft and Yright is detected, and it is determined whether or not a luminance difference between right and left of the screen is large on the basis of the difference. More specifically, it is determined whether or not a condition of an equation 11 is satisfied in the step S237, and it is determined whether or not a condition of an equation 12 is satisfied in the step S239.

$$|Yupper-Ylowr|>Yth3 \qquad \text{[equation 11]}$$

$$|Yleft-Yright|>Yth4 \qquad \text{[equation 12]}$$

Then, if neither conditions of the equations 11 and 12 is satisfied, the process proceeds to a step S241, and a possibility Peven that is a possibility of the object scene being the evening scene is set to "0". On the other hand, if at least any one of the conditions of the equations 11 and 12 is satisfied, the possibility Peven is calculated according to an equation 13 in a step S243. After completion of the process in the step S241 or S243, the process is restored to an upper hierarchical level of a routine.

$$Peven=Css/112*100 \qquad \text{[equation 13]}$$

Figure 28:
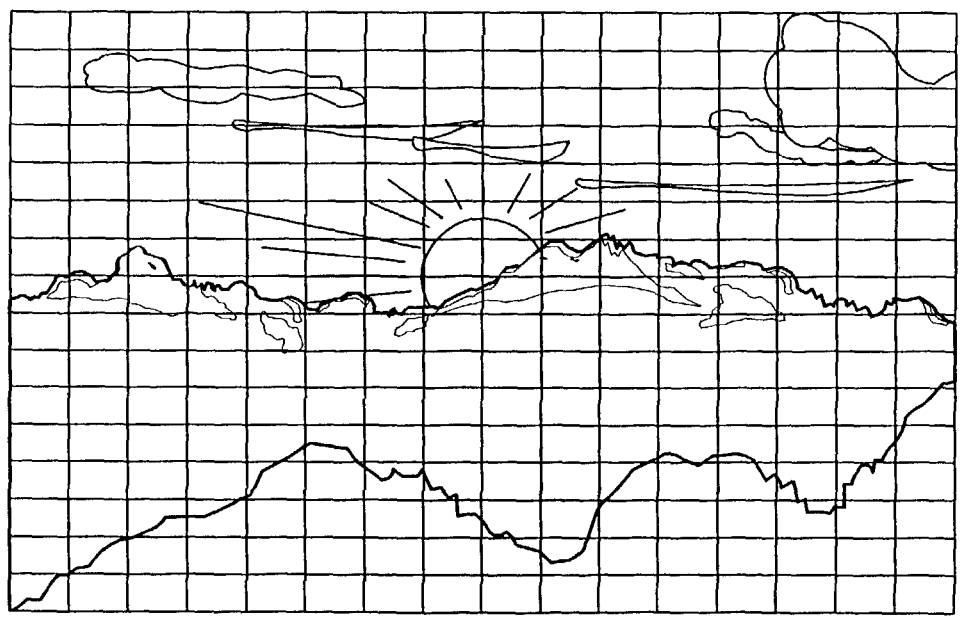
FIG. 28 is an illustrative view showing one example of an evening scene.

The number of the blocks forming the cross area CRS1 shown in FIG. 25 is "112", and the variable Css is the number of the blocks having the evening scene color and the high luminance value out of the blocks forming the cross area CRS1. Accordingly, if the variable Css is divided by "112" and the divided value is multiplied by "100", the possibility Peven is required as a percentage. It is noted that when photographing a scene in which the evening sun is set to the mountain as shown in FIG. 28, the possibility Peven indicates a high numeral value.

Figure 29:
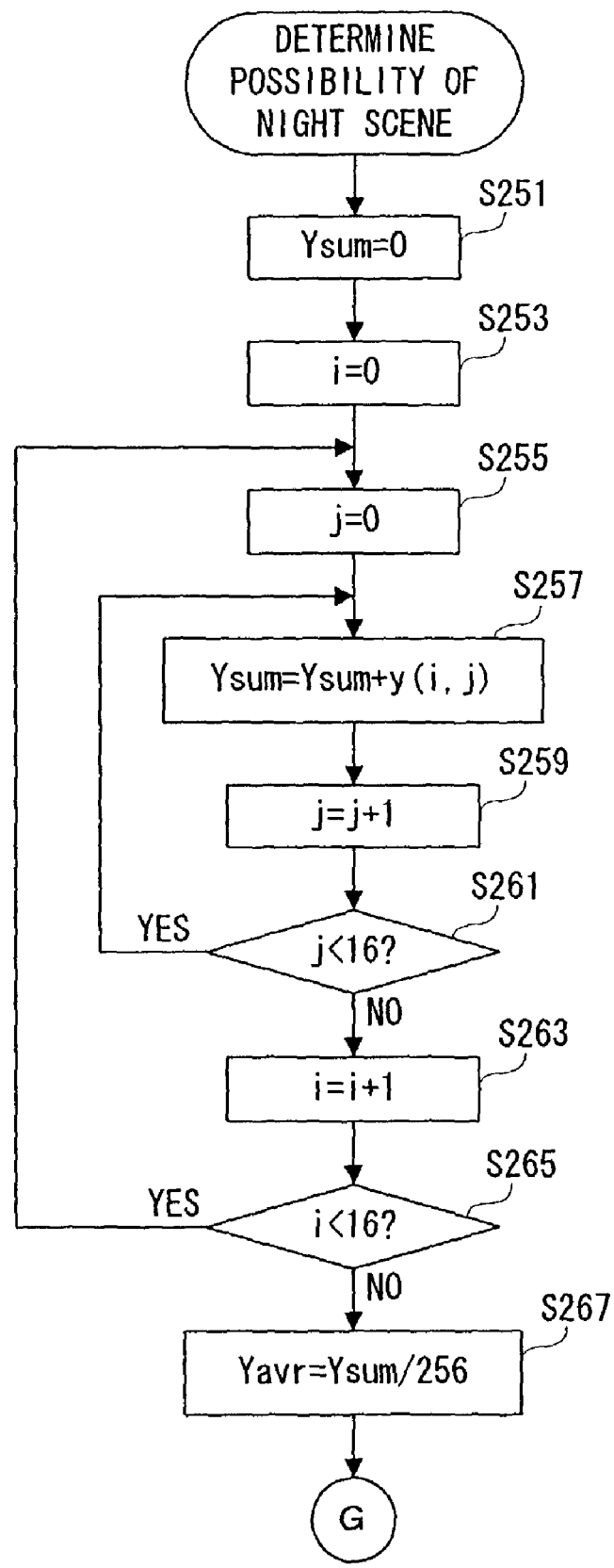
FIG. 29 is a flowchart showing a part of the operation of FIG. 1 embodiment.
Figure 30:
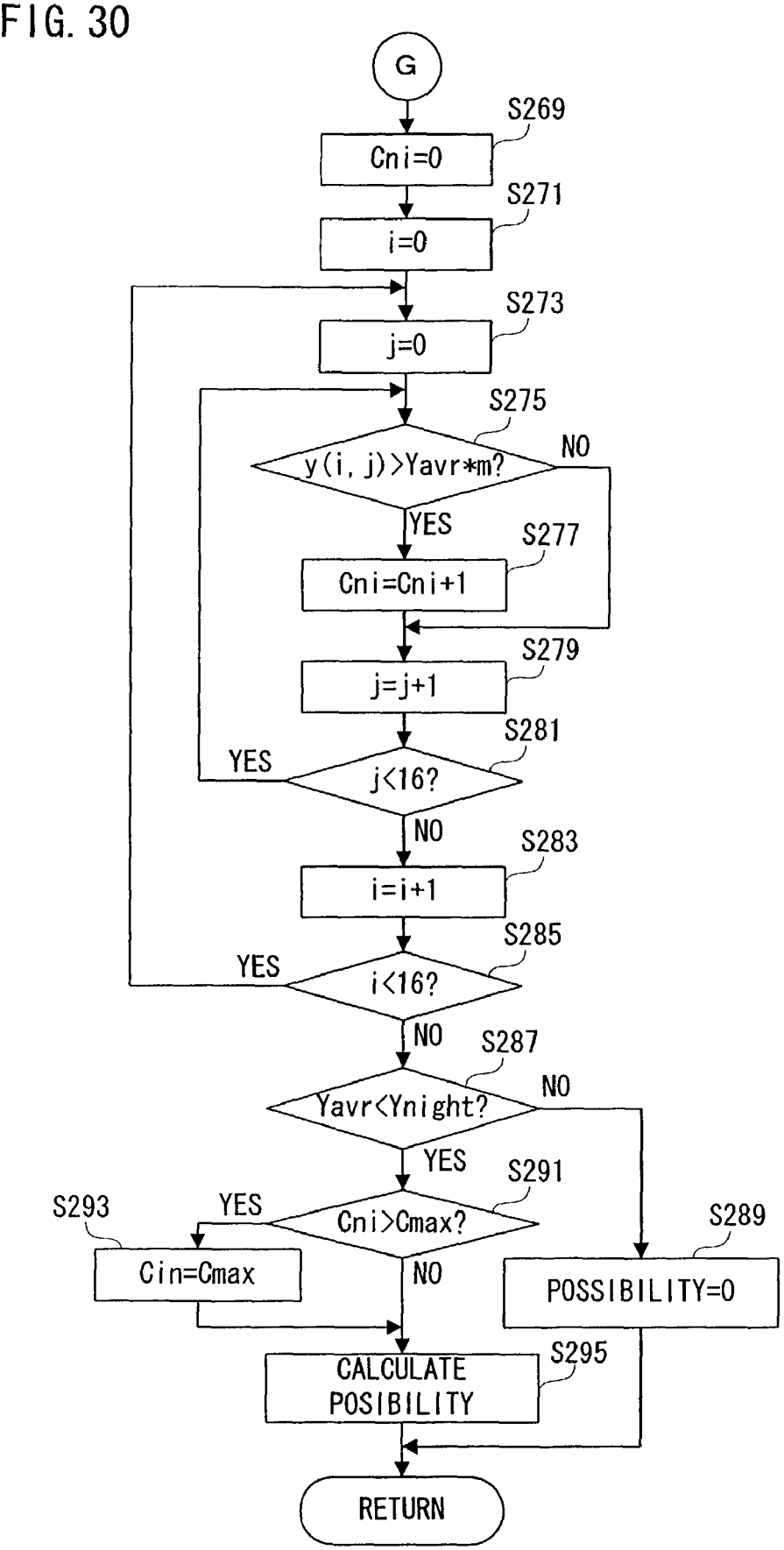
FIG. 30 is a flowchart showing another part of the operation of FIG. 1 embodiment.

The possibility determination process in the step S27 shown in FIG. 6 complies with a subroutine shown in FIG. 29 and FIG. 30. First, a luminance sum value Ysum is set to "0" in a step S251, the vertical position number i is set to "0" in a step S253, and the horizontal position number j is set to "0" in a step S255. In a step S257, the integral value y(i,j) is read from the register rgst3, and the integral value y(i,j) is added to the luminance sum value Ysum.

The horizontal position number j is incremented in a step S259, and the incremented horizontal position number j is compared with "16" in a step S261. Then, if j<16, the process returns to the step S257 while if j=16, the process proceeds to a step S263. The vertical position number i is incremented in the step S263, and the incremented vertical position number i is compared with "16" in a step S265. Then, if i<16, the process returns to the step S255 while if i=16, a luminance average value Yavr is calculated according to an equation 14.

$$Yavr=Ysum/256 \qquad \text{[equation 14]}$$

By repeating the steps S255 to S265, the luminance sum value Ysum indicates a sum of the integral values y(i,j) set in the register rgst3. Since the total number of the blocks formed on the screen is 256, the luminance average value required by the equation 14 indicates an average luminance of the screen.

The variable Cni is set to "0" in a step S269, the vertical position number i is set to "0" in a step S271, and the horizontal position number j is set to "0" in a step S273. In a step S275, the integral values y(i,j) are read from the register rgst3, and it is determined whether or not the integral value y(i,j) satisfies a condition of an equation 15.

$$y(i,j)>Yavr*m \qquad \text{[equation 15]}$$

m: constant

If the condition shown in the equation 15 is not satisfied, the process directly proceeds to a step S279 while if the condition shown in the equation 15 is satisfied, the variable Cni is incremented in a step S277 and then, the process proceeds to the step S279.

The horizontal position number j is incremented in the step S279, and the incremented horizontal position number j is compared with "16" in a step S281. Then, if j<16, the process proceeds to the step S275 while if j=16, the process proceeds to a step S283. The vertical position number i is incremented in the step S283 while the incremented vertical position number i is compared with "16" in a step S285. Then, if i<16, the process returns to the step S273 while if i=16, the process proceeds to a step S287.

By repeating the steps S273 to S285, the integral values y(i,j) of all the blocks forming the screen are compared with a multiplied value required by multiplying the luminance average value Yavr by the constant m. The variable Cni is equal to the number of the high luminance blocks in which the integral value y(i,j) exceeds the multiplied value out of 256 of blocks forming the screen.

The luminance average value Yavr is compared with a threshold value Ynight in the step S287, and if Yarv≧Ynight, a possibility Pnight that is a possibility of the object scene being the night scene is set to "0" in a step S289. On the other hand, if Yavr<Ynigt, the variable Cni is compared with a threshold value Cmax in a step S291. Then, if Cni≦Cmax, the process directly proceeds to a step S295 while if Cni>Cmax, the variable Cni is set to the threshold value Cmax in a step S293 and then, the process proceeds to the step S295. The possibility Pnight is calculated according to an equation 16 in the step S295. After completion of the step S289 or the step S295, the process is restored to an upper hierarchical level of a routine.

$$Pnight=Cni/Cmax*100 \qquad \text{[equation 16]}$$

Figure 31:
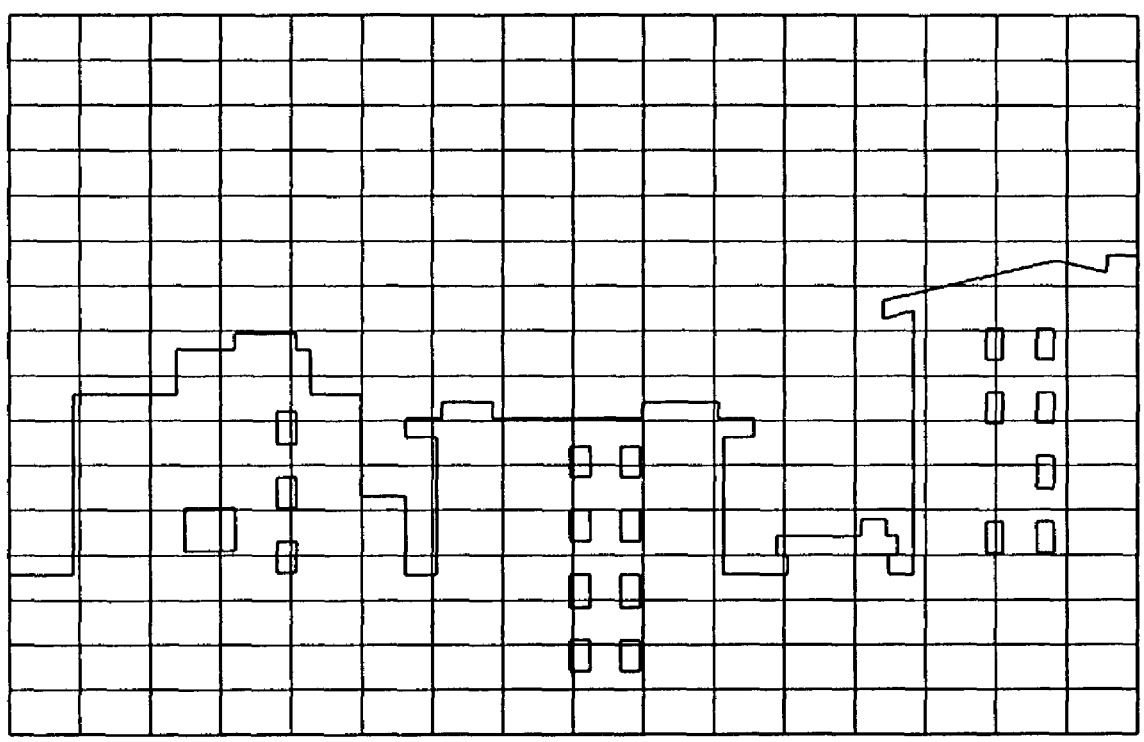
FIG. 31 is an illustrative view showing one example of a night scene.

If the luminance average value is low, the object scene has a possibility of being the night scene. Accordingly, if a condition of Yavr<Ynight is satisfied, an operation of the equation 16 is performed. The variable Cni noticed under a situation of the average value Yavr being adequately low is regarded as the number of the high luminance area dotted in the night scene. Furthermore, in a case that a luminance in an area except for the high-luminance area is considerably low, the process proceeds to the step S295 despite the fact that the more the high luminance area is, the larger the luminance average value Yavr is. Accordingly, by placing emphasis on the variable Cni relating to a size of the high luminance area, in an operation executed under a situation the luminance average value Yavr is adequately low, a possibility P night of the object scene being the night scene is required. It is noted that when photographing a crowd of high-rise buildings in which lights of windows are doted as shown in FIG. 31, the possibility Pnight indicates a high numeral value.

As understood from the above-description, at a time of determining the possibility of the sports scene, a ratio of an object having a moving amount which exceeds the threshold value Yth1 to the center area CTR1 of the object scene is detected as the variable Cctr (S107 to S111), and a ratio of an object having a moving amount which exceeds the threshold value Yth1 to the peripheral area PER1 of the object scene is detected as the variable Cper (S126 to S129). The photographing mode is decided on the basis of the detected respective ratios (S139, S29). More specifically, when a difference between the respective ratios is large, the photographing mode is set to the sports mode. When the shutter button 54 is operated, the object scene is photographed by a determined photographing mode (S39).

How the object moves in the peripheral area of the object scene and how the object moves in the center area of the object scene are clues for determining the object scene. This is the reason why, the photographing mode corresponding to the object scene is set on the basis of a first ratio detected in the peripheral area and a second ratio detected in the center area in this embodiment. Thus, operability of the camera is improved.

According to the operation of the equation 4 executed in the step S139 shown in FIG. 12, at a time a movement in the center of the screen is intensive, a possibility Psprt of the object scene being the sports scene becomes high. However, in the sports scene, there is a case that the shutter button is operated with placing the main object in the center of the screen by performing panning. Accordingly, a computing equation in which a numeral value is large when a movement in the peripheral area is more intensive than in the center area may be adopted in place of the equation 4 or in combination with the equation 4.

At a time of determining the possibility of the night scene, the average luminance of the object scene is detected (S267), and a ratio of the high luminance area to the object scene is detected (S271 to S285). The photographing mode is determined on the basis of the detected average luminance and ratio (S289, S295, S29). More specifically, the photographing mode is set to the night mode at a time of small in average luminance and high in ratio. The object scene is photographed by the determined photographing mode (S39).

The average luminance of the object scene and the ratio of the high luminance area to the object scene are clues for determining of the object scene. This is a reason why the photographing mode is determined on the basis of the detected average luminance and ratio in this embodiment. This improves operability of the camera.

At a time of determining the possibility of the evening scene, a ratio of the high luminance evening scene color area to the cross area CRS1 formed on the object scene is detected (S195), and a luminance difference between the periphery areas opposed with each other is detected (S237, S239). The photographing mode is determined on the basis of the detected ratio and luminance difference (S241, S243, S29). More specifically, the photographing mode is set to the evening scene mode at a time of large in luminance difference and high in ratio. The object scene is photographed in the determined photographing mode (S39).

A ratio of the high luminance evening scene area occupied to a defined area formed in the object scene in a cross shape and the luminance difference between peripheral areas opposed with each other in the object scene becomes clues for determining the object scene. This is the reason why a photographing mode corresponding to the object scene is set on the basis of the detected ratio and the luminance difference in this embodiment. Thus, ease of operation of the camera is improved.

At a time of determining the possibility of the portrait scene, the distance L1 to the main object existing in the object scene is determined on the basis of the positions of zoom lens 12 and the focus lens 14 (S141, S143), and the distance L2 between the focus lens 14 and the image sensor 20 is determined on the basis of the position of the focus lens 14 (S145). The face area to be occupied by a face of a person on the light-receiving surface of the image sensor 14 is specified on the basis of the distances L1 and the distance L2 (S147 to S155). On the other hand, the skin color area of the object scene is detected on the basis of the integral values r(i,j), g(i,j), and b(i,j) (S163). The photographing mode is determined on the basis of the size of the skin color area included in the face area and the size of the skin color area except for the face area (S179, S29). If the possibility Pptrt calculated based on each of sizes is the largest, the photographing mode is determined to be the portrait mode. The object scene is photographed by the determined photographing mode (S39).

Thus, since the photographing mode is determined on the basis of a relation between the face area specified based on the distance L1 to the main object and the skin color area of the object scene, it is possible to improve operability of the camera.

It is noted that although a description is made utilizing a digital camera in this embodiment, it is needless to say that the present invention can be applied to a video camera in an analog format or a silver salt film camera.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A camera performing photographing in accordance with a photographing mode corresponding to an object scene when a photographing operation is performed, comprising:

a first ratio detector which detects a first ratio of movement of an object exceeding a first threshold value in a moving amount in a center area of said object scene;

a second ratio detector which detects a second ratio of movement of an object exceeding a second threshold value in the moving amount in a peripheral area of said object scene;

a determiner which determines the highest probability that the object scene is one of a plurality of object scene types based on the first ratio of movement and the second ratio of movement respectively detected by said first ratio detector and said second ratio detector; and a selector which selects the photographing mode based on the highest probability that the object scene is one of the plurality of object scene types determined by said determiner.

2. A camera according to claim 1, wherein said selector selects a sports mode as the photographing mode when a difference between the first ratio of movement and the second ratio of movement is large.

3. A camera according to claim 1, further comprising:
 a first fetcher which fetches a first image signal of said object scene photographed just before the photographing operation is performed;
 a second fetcher which fetches a second image signal of said object scene photographed immediately after the photographing operation is performed; and
 a difference detector which detects a difference between the first image signal and the second image signal as the moving amount.

4. A camera according to claim 1, further comprising an outputter which outputs a message corresponding to a photographing mode selected by said selector.

5. A photographing mode determining method of a camera which performs photographing when the photographing operation is performed, comprising steps of:
 (a) detecting a first ratio of movement of an object exceeding a first threshold value in a moving amount in a center area of an object scene;
 (b) detecting a second ratio of movement of an object exceeding a second threshold value in the moving amount in a peripheral area of said object scene;
 (c) determining highest probability that the object scene is one of a plurality of object scene types based on the first ratio of movement and the second ratio of movement respectively detected by said step (a) and said step (b); and
 (d) selecting the photographing mode based on the highest probability that the object scene is one of the plurality of object scene types determined by said step (c).

6. A camera performing photographing in accordance with a photographing mode corresponding to an object scene when a photographing operation is performed, comprising:
 a first ratio detector which detects a first ratio of movement of an object exceeding a first threshold value in a moving amount in a center area of said object scene;
 a second ratio detector which detects a second ratio of movement of an object exceeding a second threshold value in the moving amount in a peripheral area of said object scene;
 a determiner which determines the highest probability that the object scene is one of a plurality of object scene types based on first ratio of movement and the second ratio of movement respectively detected by said first ratio detector and said second ratio detector; and
 a selector which selects the photographing mode based on the highest probability that the object scene is one of the plurality of object scene types determined by said determiner;
 wherein the first ratio and the second ratio correspond to a ratio of movement change between a first time period and a second time period.

* * * * *